US012750841B2

(12) United States Patent
Sood et al.

(10) Patent No.: US 12,750,841 B2
(45) Date of Patent: Sep. 29, 2026

(54) METHODS, DEVICES AND SYSTEMS FOR IMPROVING TRANSMISSION PROTECTION RATES FOR RADIO CIRCUITS THAT COEXIST WITH WLAN CIRCUITS

(71) Applicant: Cypress Semiconductor Corporation, San Jose, CA (US)

(72) Inventors: Ayush Sood, Bengaluru (IN); Sandeep Sarma Munukutla, Bangalore (IN); Raghavendra Kencharla, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 534 days.

(21) Appl. No.: 17/955,089

(22) Filed: Sep. 28, 2022

(65) Prior Publication Data

US 2024/0107515 A1 Mar. 28, 2024

(51) Int. Cl.

| | |
|---|---|
| ***H04W 72/12*** | (2023.01) |
| ***H04W 74/0816*** | (2024.01) |
| ***H04W 84/12*** | (2009.01) |
| ***H04W 88/06*** | (2009.01) |

(52) U.S. Cl.

CPC ... *H04W 72/1215* (2013.01); *H04W 74/0816* (2013.01); *H04W 88/06* (2013.01); *H04W 84/12* (2013.01)

(58) Field of Classification Search

CPC ............. H04W 72/1215; H04W 28/22; H04W 74/0816; H04W 84/12; H02J 13/00026; H04B 2201/71346; H04L 45/52

See application file for complete search history.

(56) References Cited

U.S. PATENT DOCUMENTS

| | | | | |
|---|---|---|---|---|
| 2010/0008347 A1* | 1/2010 | Qin | H04W 74/04 | 370/345 |
| 2010/0268841 A1* | 10/2010 | Xhafa | H04W 72/1215 | 709/231 |
| 2012/0207101 A1* | 8/2012 | Chang | H04W 72/1215 | 370/329 |
| 2012/0276938 A1* | 11/2012 | Wagholikar | H04W 72/0446 | 455/514 |
| 2014/0057559 A1* | 2/2014 | Smith | H04B 5/45 | 455/41.1 |
| 2015/0373716 A1* | 12/2015 | Su | H04W 4/80 | 370/338 |
| 2017/0347373 A1* | 11/2017 | Vig | H04W 4/80 | |
| 2021/0076222 A1* | 3/2021 | Malinen | H04W 40/244 | |

FOREIGN PATENT DOCUMENTS

| | | | |
|---|---|---|---|
| CN | 103493572 A * | 1/2014 | H04W 84/12 |

* cited by examiner

*Primary Examiner* — Jay L Vogel

(57) ABSTRACT

A method can include, by operation of WLAN circuits, determining an estimated duration for communications of a coexisting wireless circuit (coex communications). In response to at least the medium being free, a CTS-to-self frame can be transmitted having a first duration equivalent to the estimated duration for the coex communications. At an actual start for the coex communications, if the first duration is not sufficient to cover the actual duration, a second CTS-to-self frame can be transmitted with a second duration that extends beyond the first duration sufficient to cover the actual duration. Corresponding devices and systems are also disclosed.

13 Claims, 14 Drawing Sheets

METHODS, DEVICES AND SYSTEMS FOR IMPROVING TRANSMISSION PROTECTION RATES FOR RADIO CIRCUITS THAT COEXIST WITH WLAN CIRCUITS

TECHNICAL FIELD

The present disclosure relates generally to wireless systems, and more particular to wireless systems and devices that include different radio circuits that can share a same medium, or otherwise interfere with one another.

BACKGROUND

The availability of unlicensed wireless bands, such as the 2.4 GHz ISM (International Scientific and Medical) band has given rise to various wireless protocols/standards that share essentially the same medium. Various IEEE 802.11 wireless standards (collectively referred to as WLAN herein) operate in the 2.4 GHz band. While WLAN provides many advantageous features, it is desirable to provide systems that include other wireless protocols, such as those that consume less power but operate at lower range, such as Bluetooth (BT), including Bluetooth Low Energy. This has given rise to WLAN-BT "coexistence" (coex) devices. Such devices can include both WLAN circuits and BT circuits that share a transmission medium (i.e., BT channels overlapping a WLAN channel). A drawback to coex devices can be the potential for interference between WLAN and BT transmission and/or the inability for such transmissions to occur simultaneously, particularly when one protocol is transmitting while the other is receiving.

One conventional approach to addressing competing accesses to the same medium can be to assign priority to one protocol. For example, when BT transmissions are to occur, WLAN transmissions are terminated. A drawback to such an approach can be that WLAN transmissions can be deferred too often, degrading WLAN throughput/performance.

Another conventional approach can be to use the existing WLAN protection mechanism Clear-to-Send-to-Self (CTS-to-Self). A CTS-to-Self was typically used to accommodate legacy WLAN versions, but has been adopted to protect WLAN receive operations from being susceptible to rate fluctuations due to coexisting radio circuits, such as BT or other protocols, such as Zigbee or Thread. Ideally, WLAN circuits would cancel on-going activity after receiving a request from a coexisting BT circuit, and transmit a CTS-to-Self. The CTS-to-Self can be sent out with the duration communicated from the BT circuits. If the cancelled on-going WLAN activity is WLAN Tx, then no degradation in WLAN performance is observed. However, if the cancelled WLAN activity is WLAN Rx, there can be negative impacts on performance. First, because of on-going WLAN activity in a basic service set (BSS), the WLAN circuit might not get an opportunity to win the medium and transmit a CTS-to-self. Second, when WLAN circuits cancel a receive request, the requesting (to send) device receives no acknowledgement (ACK). Such a requesting device that continues to make requests and receive no ACKs, can mis-interpret the situation as a poor transmission environment, and switch to a lower transmission rate in a next attempt, degrading performance.

FIG. 20 is a timing diagram showing a conventional approach to using CTS-to-Self (CTS-2-Self) frames for BT accesses to a shared medium. In FIG. 20, WLAN Peer Activity shows activity of peer device, including requests to a WLAN device under test (DUT) (e.g., coex device). WLAN DUT Activity can show activity of WLAN circuits of a device having coex BT circuits. BT RF Active can be a signal generated by BT circuits signaling that BT Activity is about to start. BT Activity shows actual activity of the coex BT circuits. CTS-2-Self shows CTS-2-Self frames generated by the WLAN DUT.

Referring still to FIG. 20, at time t0, there can be WLAN activity between a peer device and the DUT. In particular, a peer device can be transmitting data for reception by the DUT.

At time t1, BT RF Active can indicate that BT activity is imminent. In response, WLAN DUT can drop data reception from the WLAN Peer. As a result, transmissions from peer device are not acknowledged by the DUT. Also at time t1, the DUT can assess the channel to determine if a CTS-2-Self frame can be transmitted. However, due to channel activity (e.g., by the peer device), the CTS-2-Self frame is not transmitted.

At time t2, following a delay "BT Advance", actual BT activity can begin. However, because a CTS-2-Self frame was not transmitted by the DUT, such BT activity may be adversely affected by other activity on the medium. From time t2 to t3, the peer device would re-transmit and would not receive a response from the DUT. This can lead the peer device to re-transmit in subsequent tries with an even more scaled down rate.

At time t3, BT RF Active can return to inactive as actual BT Activity ends.

At time t4, a same set of conditions can occur, with BT Activity being indicated, and the DUT being unable to return an ACK to the peer device and unable to transmit a CTS-2-Self frame as it cannot get control of the medium.

Because of the low protection success rates that can occur in situations like that of FIG. 20, a peer device can misinterpret failure to receive ACKs from the DUT, and scale down a modulation coding scheme (MCS) for subsequent transmissions. Such reduced data rates can adversely affect WLAN system performance.

It would be desirable to arrive at some way of improving medium access for devices having WLAN circuits and another coex wireless circuits.

SUMMARY

Embodiments can include devices and/or systems having IEEE 802.11 wireless compatible (WLAN) circuits and one or more coexisting wireless (coex) circuits. By operation of WLAN circuits, an estimated duration for coex communications can be determined. In response to at least a medium being free, WLAN circuits can transmit a first clear-to-send-to-self (CTS-to-self) frame at an estimated start time for the coex communications. The first CTS-to-self frame can have a first duration equivalent to the estimated duration for the coex communications. In response to receiving an actual coex communication start signal indicating an actual start for the coex communications, WLAN circuits can determine if the duration of the first CTS-to-self frame is sufficient to cover an actual duration for the actual coex communications. If the first duration is not sufficient to cover the actual duration, a second CTS-to-self frame can be transmitted with a second duration that extends beyond the first duration sufficient to cover the actual duration.

DETAILED DESCRIPTION

Embodiments can include combination devices and systems having IEEE 802.11 wireless compatible (WLAN) circuits and one or more other coexisting (coex) radio circuits. Coex circuits can share a medium with WLAN circuits and/or the operation of WLAN circuits can interfere (e.g., generate interfering harmonics) with the coex circuits. WLAN circuits can receive data on future coex activity, including the estimated duration of such activity. Prior to future coex activity, WLAN circuits can "back-off" from servicing requests to ensure control of the medium around the time of coex activity. At the time of coex activity, WLAN circuits can issue a Clear-to-Send-to-Self (CTS-to-Self) having a duration equal to or greater than the estimated duration of the coex activity.

In some embodiments, after issuing a first CTS-to-self, WLAN circuits can determine if a duration of the first CTS-to-self is sufficient to protect the coex activity. If not, WLAN circuits can issue a second CTS-to-self having a duration sufficient to cover the coex activity. This evaluation can be done by WLAN circuits after receiving duration information from a coex radio circuit. In some embodiments, such an evaluation can be done at the time coex circuits actually assert an active indication of coex radio activity. Communication of duration information by coex circuits can occur over any suitable communication channel, including but not limited to a general coexistence interface (GCI), a serial enhanced coexistence interface (SECI) or a custom interface.

In some embodiments, WLAN circuits can also issue power mode indication frames in addition to CTS-to-self frames to protect coex activity. In particular, for coex activity of larger durations, WLAN circuits can issue a frame indicating a low power mode, which can result in peer devices refraining from transmitting to the WLAN circuits.

FIGS. 1A to 1E are a sequence of diagram showing coexistence operations according to embodiments. FIGS. 1A to 1E show a device (or system) 100 that includes WLAN circuits 102 and coexisting wireless (coex) circuits 104 connected by a communication path 106. Coex circuits can include wireless circuits that can operate on the same medium as WLAN circuits 102. Communication path 106 can take any suitable form, including a wired connection, such as a serial bus.

Figure 1A:
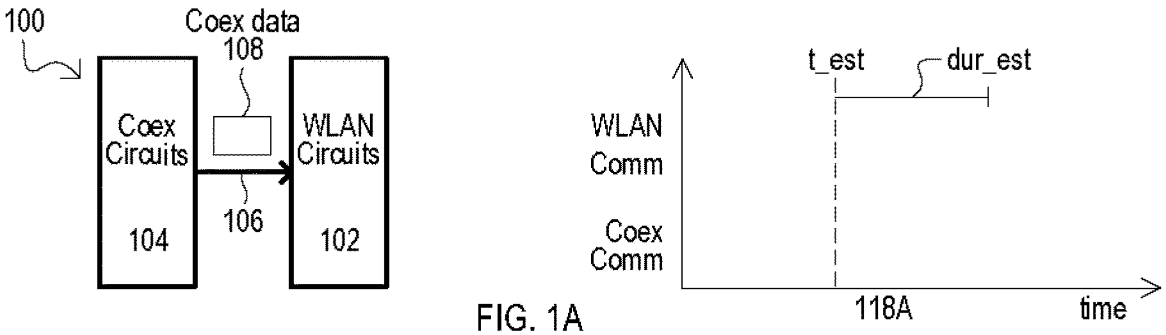
FIGS. 1A to 1E are diagrams showing operations of systems and devices having IEEE 802.11 wireless (WLAN) circuits and other wireless (coex) circuits according to embodiments.

FIG. 1A shows the transmission of coex data 108 from coex circuits 104 to WLAN circuits 102. From received coex data 108, WLAN circuits 102 can determine duration (dur_est), and optionally, an estimated start time (t_est) for a future transmissions for coex circuits 104. FIG. 1A includes a timing diagram 118A shows t_est and dur_est.

Figure 1B:
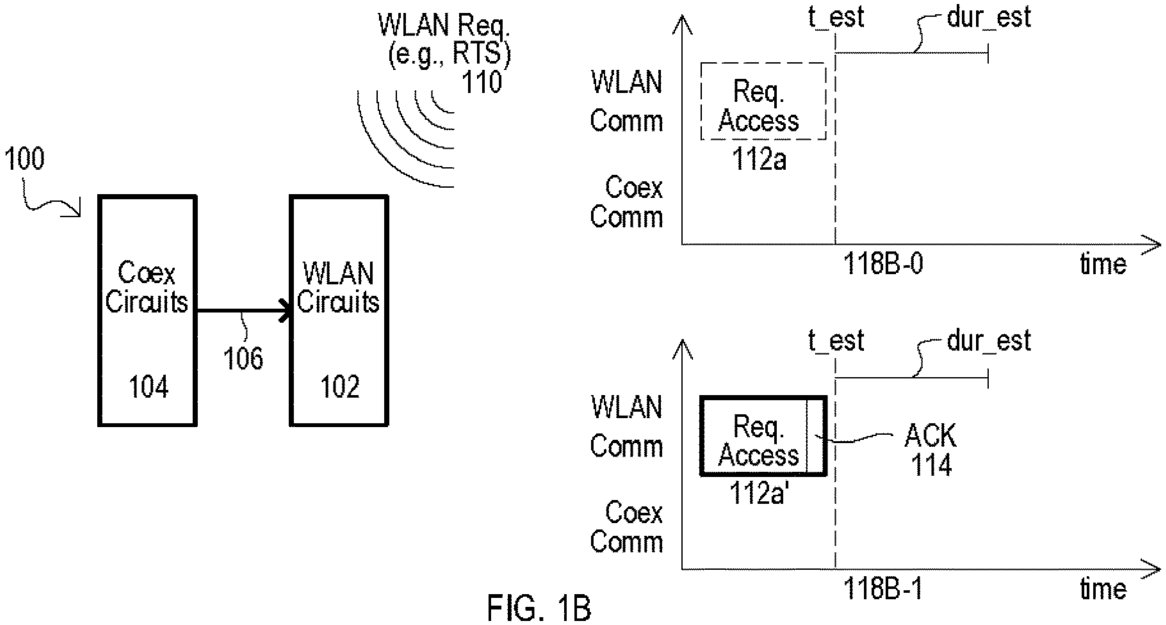

FIG. 1B shows a device 100 having a request to access the medium 110. Such a request and include any suitable form, and in some embodiments can be a request for the device 100 to receive data from another device (e.g., peer WLAN device). However, in alternate embodiments such a request can be for WLAN circuits 102 to transmit data. Further, while a WLAN access request 110 can be external to a device 100, such a request 110 can also be generated by a device 100 itself (e.g., an application resident on the device). In response to a WLAN access request 110, a device 100 can determine if such a request can be completed prior to t_est.

As shown in timing diagram 118B-0, in response to a WLAN access request 110, a device 100 determines that a duration of an access request 112*a* can be completed prior to t_est. Consequently, as shown in timing diagram 118B-1, the requested access can be executed 112*a*' including sending an ACK 114. However, in alternate embodiments, WLAN circuits may not make such a determination, and can cease WLAN operations in response to receiving coex data 108.

Figure 1C:
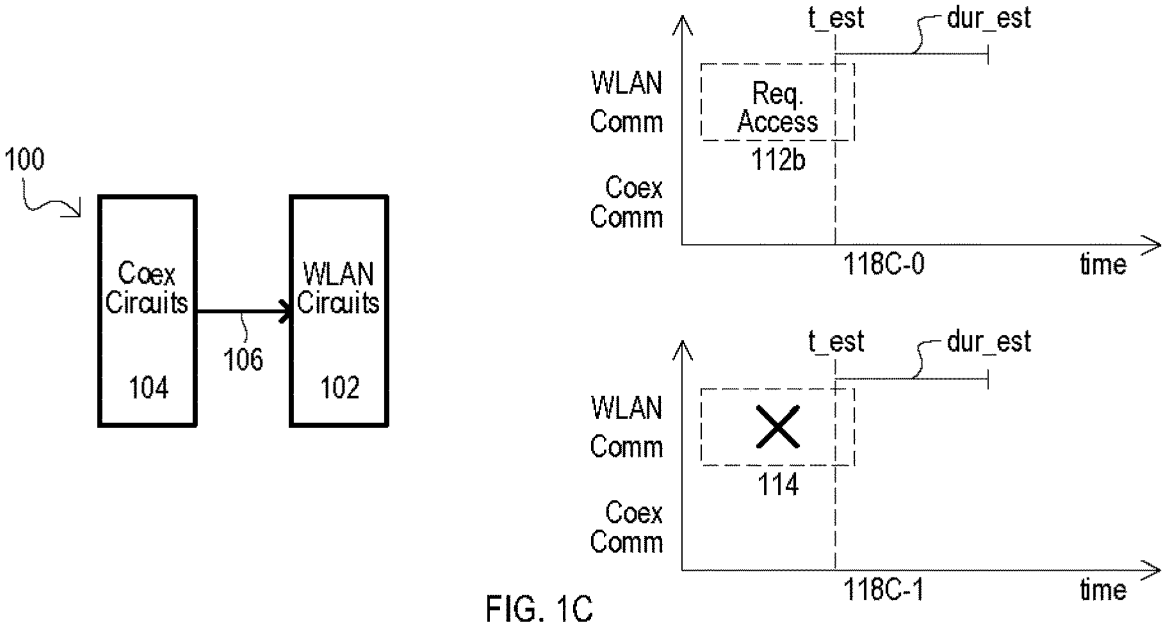

FIG. 1C shows a device 100 having a request to access the medium 110 like that of FIG. 1B. However, as shown in timing diagram 118C-0, a device 100 determines that a duration of an access request 112*b* cannot be completed prior to t_est. Consequently, as shown in timing diagram 118C-1, the requested access is not executed. In this way, WLAN circuits 104 can back-off WLAN operations (e.g., receive requests) to protect the media in advance (i.e., ensure WLAN circuits can win the medium for a CTS-to-Self).

Figure 1D:
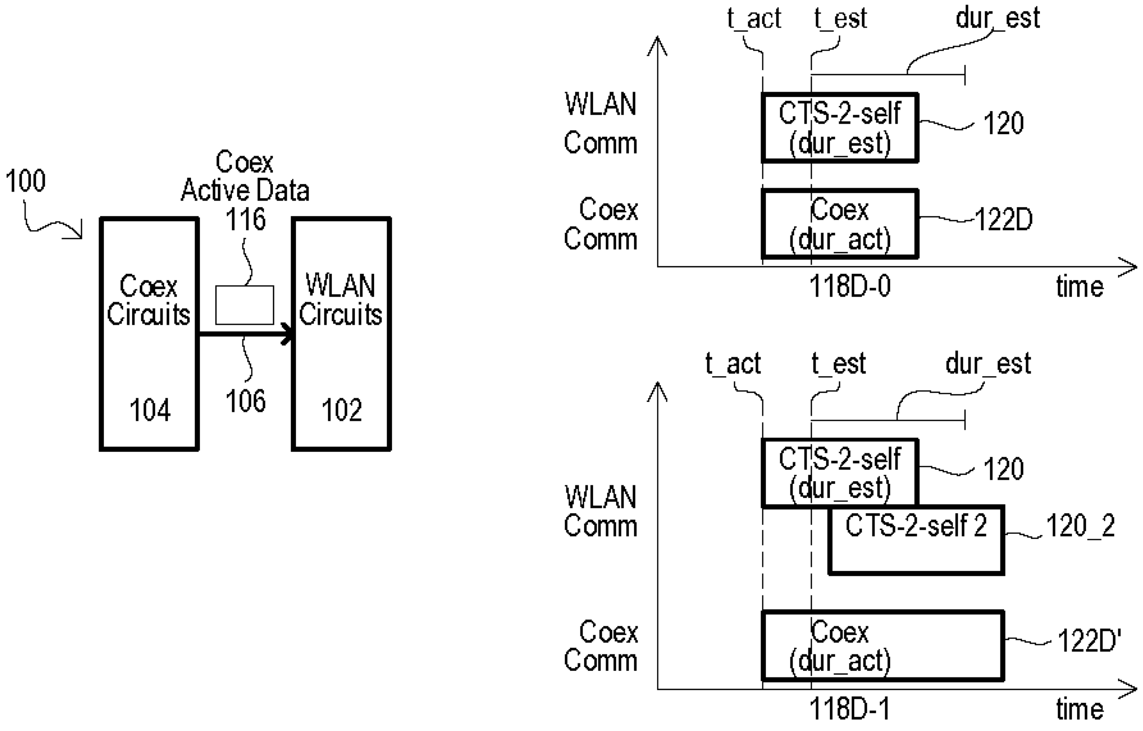
Figure 1E:
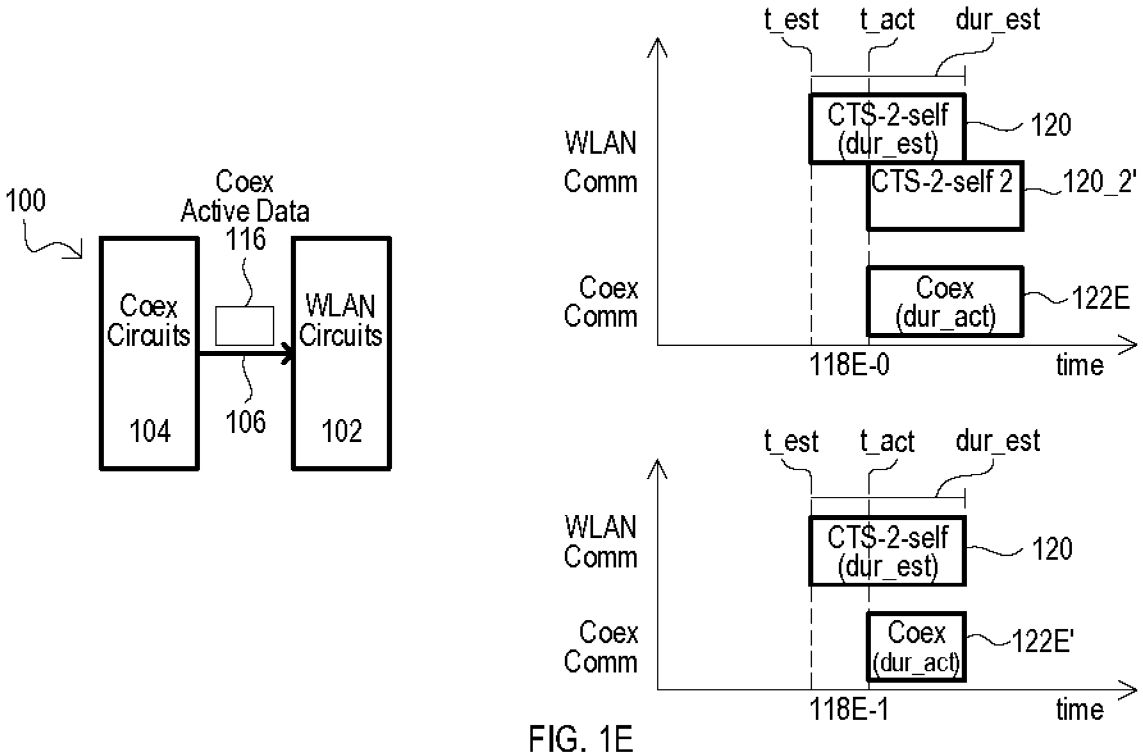

FIGS. 1D and 1E shows the transmission of coex active data 116 from coex circuits 104 to WLAN circuits 102. Coex active data 116 can indicate the actual start time of coex wireless activity (t_act), which may or may not be the same as t_est. In some embodiments, coex active data 116 can include information indicating an actual duration (dur_act) of the coex activity, which may or may not be the same as dur_est. In response to coex active data 116, WLAN circuits 102 can transmit a CTS-to-Self to reserve the medium for the estimated duration 120 for use by coex circuits 104. Further, because WLAN circuits 104 can ensure no WLAN requests occur around t_est, by backing off WLAN request, the medium is likely to be clear for the CTS-to-Self.

FIG. 1D shows responses in which t_act can precede t_est. Timing diagram 118D-0 shows operations when an actual coex activity duration 122D is not longer than an originally estimated duration dur_est 120. Thus, a CTS-2-Self issued at t_act in response to coex active data 116 can reserve the medium for coex wireless operations. Timing diagram 118D-1 shows operations when an actual coex activity duration 122D' extends beyond an originally estimated duration dur_est 120. Thus, the first CTS-to-Self of duration (dur_est) 120, is not sufficient to clear the medium for coex activity. Consequently, WLAN circuits 104 can issue a second CTS-to-Self (CTS-2-Self 2) with a duration 120_2 sufficient to reserve the medium for the entire coex activity duration 122D'.

FIG. 1E shows responses in which t_act can follow t_est. Timing diagram 118E-0 shows WLAN circuit issuing a CTS-to-Self attest of duration dur_est 120, which is not sufficient to protect coex activity for its full duration 122E. Consequently, as in the case of timing diagram 118D-1, WLAN circuits 104 can issue a CTS-2-Self 2 with a duration 120_2' sufficient to reserve the medium for the entire coex activity duration 122E. Timing diagram 118E-1 shows an operation in which a CTS-2-Self is issued at t_est, but an actual duration for coex activity 122E' is shorter than dur_est, thus the CTS-2-Self is sufficient to reserve the medium for the entire coex activity duration 122E'.

In this way, WLAN circuits can determine an estimated duration for future coex circuit activity, and back-off a WLAN request that might interfere. WLAN circuits can then issue a CTS-to-self to reserve the medium for the estimated duration of the coex circuit activity. If the CTS-to-self is determined to be too short for the actual coex activity, a second CTS-to-Self can be issued having sufficient duration to reserve the medium for the coex activity.

According to embodiments, in a system having WLAN circuits that coexist with BT circuits, BT activity can be deterministic. In response to such deterministic BT activity, WLAN circuits can estimate the amount of time left for imminent BT activity and back-off WLAN operations (e.g., receive operations) when such operations cannot be accommodated before the imminent BT activity. WLAN circuits can then transmit a CTS-to-Self to protect the BT activity.

BT circuits can also communicate a duration of imminent BT activity in advance to the actual BT activity. This can be used to establish a duration of the CTS-to-Self. In some embodiments, a duration of future BT circuit transmit operations can be determined from BT circuit buffers. In some embodiments, a duration of future BT circuit receive operations can be determined from BT circuit reception history.

In some embodiments, future BT activity can be provided by WLAN circuits sampling BT circuit data over an interface, such as a general coexistence interface (GCI), as but one of many examples. In some embodiments, WLAN circuits can sample BT circuit data a second time when the actual BT activity occurs. In response to such BT activity data, WLAN circuits can issue a second CTS-to-Self in the event the duration of the first CTS-to-Self is not sufficient to cover the actual BT activity duration.

Figure 2:
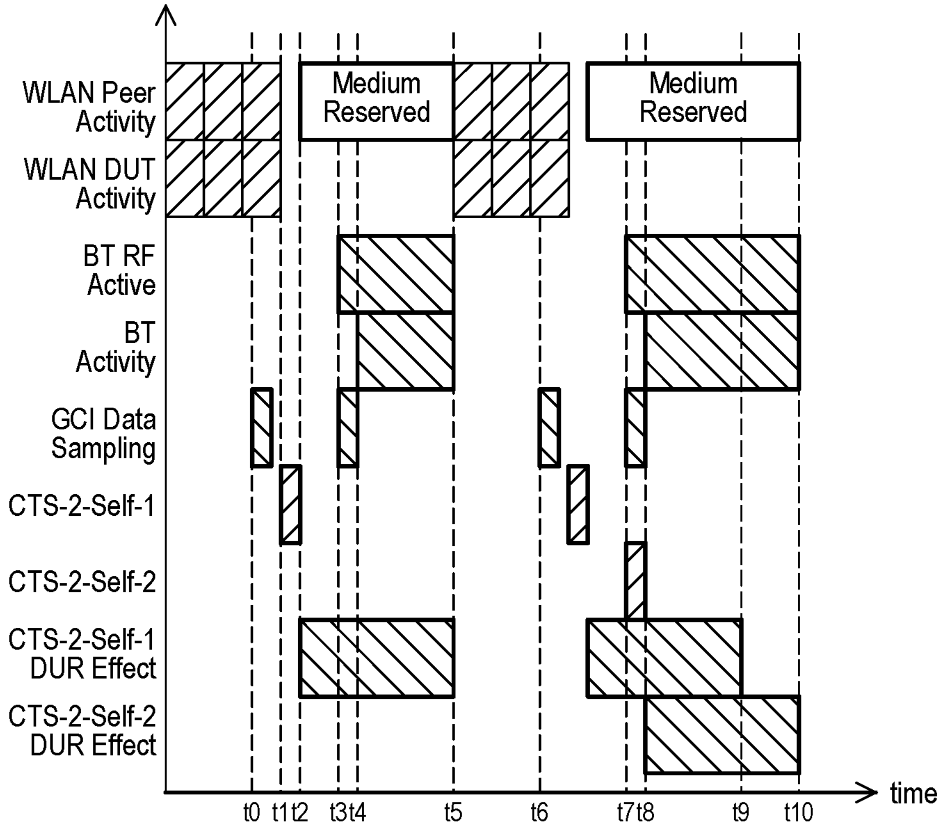
FIG. 2 is a timing diagram showing WLAN circuits that issue clear-to-send-to-self (CTS-to-self) frames to protect transmissions of coexistent Bluetooth (BT) circuits.

FIG. 2 is a timing diagram showing operations according to another embodiment. FIG. 2 shows wireless transmissions (or lack thereof) in a medium used by WLAN network (e.g., BSS) that includes a device with WLAN circuits and coexisting BT circuits (WLAN DUT) as well as another WLAN peer device. "WLAN Peer Activity" shows activity of a WLAN peer device, which can include the transmission of data from the WLAN peer device to the WLAN DUT or the reception of data by the WLAN peer device from the WLAN DUT. "WLAN DUT Activity" shows some operations of the WLAN DUT, which can include the reception of data transmitted from a WLAN peer device or the transmission of data to the WLAN peer device. "BT RF Active" shows an indication from coex BT circuits to WLAN DUT circuits indicating the start of actual BT activity. "BT Activity" indicates actual BT transmission on the medium.

"GCI Data Sampling" shows the reception of BT transmission data by WLAN DUT circuits from coex BT circuits over a global coexistence interface (GCI). A GCI can be configured to enable WLAN circuits to communicate via a serial data protocol with other coexisting circuits, such as BT circuits, but also cellular communication circuits in some embodiments. In some embodiments, a WLAN DUT circuits can request BT transmission data. In other embodiments, coex BT circuits can transmit such data automatically to WLAN DUT circuits.

"CTS-2-Self-1" shows a first CTS-to-Self issued by WLAN DUT circuits in response to anticipated BT Activity. "CTS-2-Self-2" shows a second CTS-to-Self issued by WLAN DUT circuits. "CTS-2-Self-1 DUR Effect" can indicate a duration indicated by a CTS-to-Self-1. "CTS-2-Self-2 DUR Effect" can indicate a duration indicated by a CTS-to-Self-2.

Referring still to FIG. 2, prior to time to, a WLAN peer device and the WLAN DUT circuits can use the medium for transmissions, including the WLAN peer device transmitting data for reception by the WLAN DUT circuits.

At time t0, WLAN DUT device can acquire sample data over a GCI that can indicate a state of BT circuits. Such an action can result in WLAN DUT circuits determining a duration of future BT Activity, and in some embodiments an estimated start time for such future BT activity. Further, in response to such data, WLAN circuits begin backing-off from communications with WLAN peer device (or any other devices of the BSS) to ensure the medium will be clear. WLAN DUT circuits can then begin monitoring the medium for an opportunity to transmit a CTS-to-Self.

At time t1, with the medium uncontested, WLAN DUT circuits can transmit a first CTS-to-Self having a duration equal to an estimated BT Active time derived from the GCI data sampling at time t0. CTS-2-Self-1 DUR Effect shows how the medium can be reserved from time t1 to time t5 in response to the CTS-2-Self 1.

At time t3, BT RF Active can go active. At about this time, WLAN DUT circuits can sample BT data over the GCI again. Such an action can enable WLAN DUT circuits to determine if the first CTS-to-Self has a duration sufficient to protect the entire BT Active time period. In the embodiment shown, it is determined the first CTS-to-Self is sufficient for the BT activity.

At time t4, actual BT activity can start and then conclude at time t5, within a medium reserved period established by the first CTS-to-Self.

At time t6, operations can start in the same fashion as at time t0.

At time t7, operations can differ from the previous case. Upon sampling BT circuit state data over the GCI, WLAN DUT circuits can determine that the duration of the first CTS-to-Self is not sufficient to protect actual BT active time. That is, the first CTS-to-Self medium reservation period will end at time t9, before BT Activity has ended. Consequently, WLAN DUT circuits can issue a second CTS-to-Self that last from time t8 to time t10, which adequately protects BT circuit activity.

The capability of issuing a second CTS-to-Self can prevent "under protection" of BT Activity. Under protection can arise in the event a network allocation vector (NAV) generated in a peer WLAN device from a first CTS-to-Self expires, and the per WLAN device accesses the medium while it is still in use by the coexisting circuit (e.g., BT). Further, in such a case, a WLAN peer may initiate packets and an unresponsive WLAN circuit may cause the WLAN peer to scale down transmission rates (MCS index) in subsequent retries.

In this way, a WLAN circuit can sample state data for coexisting BT circuits, and upon determining that BT activity is planned, back-off from WLAN activity. When the medium is free the WLAN circuit can issue a first CTS-to-Self to reserve the medium for BT activity. When the actual BT activity begins, if the first CTS-to-Self is not of sufficient duration, a second CTS-to-Self can be issued to ensure BT activity is protected.

In some embodiments, WLAN circuits can operate with another coexisting radio circuits (e.g., BT circuits), where coex activity occurrence is deterministic but coex activity duration is not deterministic. WLAN circuits can provide a hybrid mode of protection that can use a CTS-to-Self mechanism or a power management state to reserve a medium, particularly for coexisting circuit activity having a duration over a predetermined length.

Figure 3:
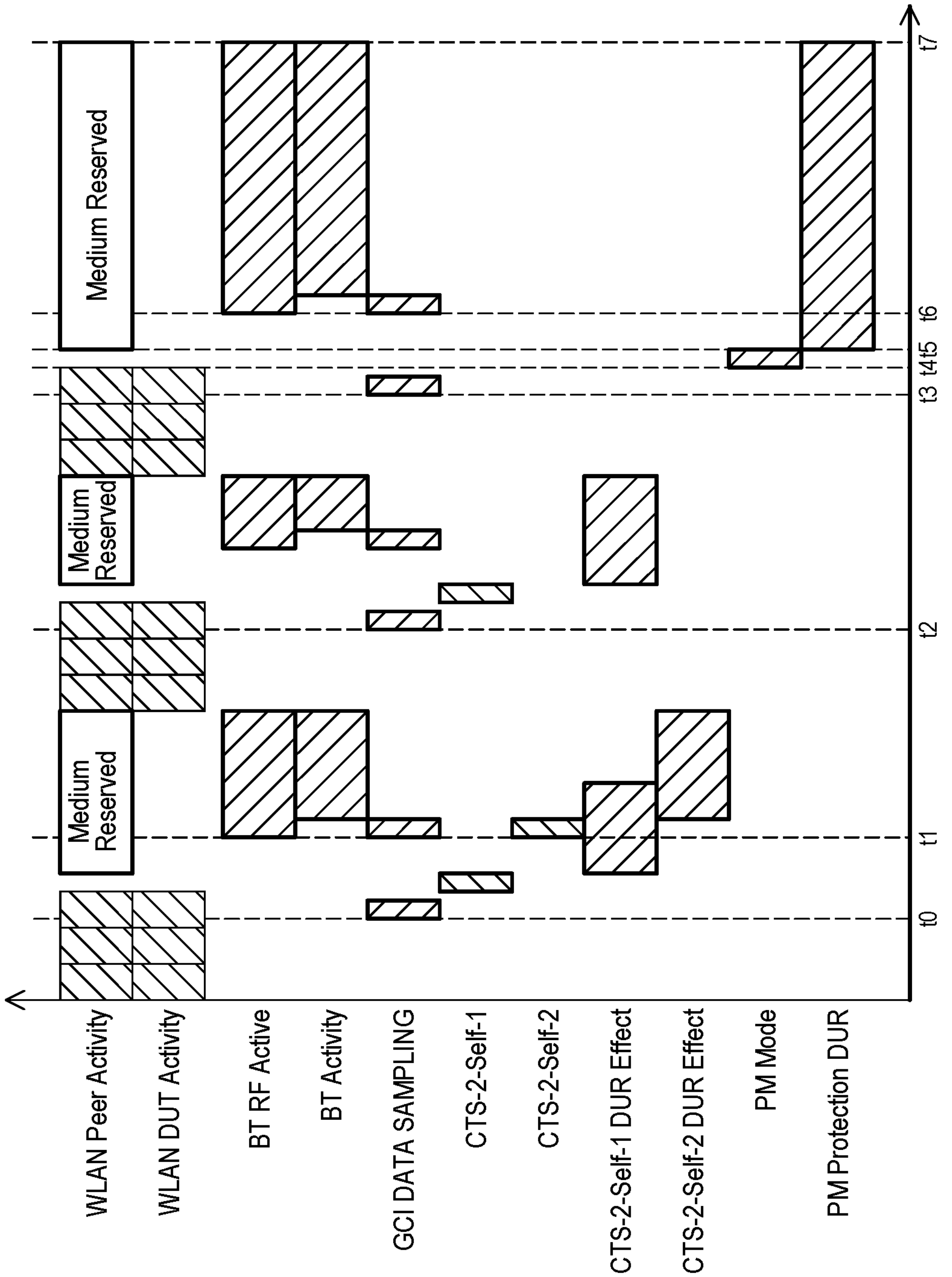
FIG. 3 is a timing diagram showing WLAN circuits that issue CTS-to-self frames or power management frames to protect transmissions of coexistent BT circuits.

FIG. 3 is a timing diagram showing operations according to another embodiment. FIG. 3 shows wireless transmissions (or lack thereof) in a medium for an arrangement like that of FIG. 2. FIG. 3 differs from that of FIG. 2 in that it further includes "PM Mode" which can indicate the transmission of a power management state for WLAN DUT circuits and "PM Protection DUR" which can indicate the duration of the power management mode.

Referring to FIG. 3, operations starting at time t0 show operations like those starting at time t6 in FIG. 2. However, a sampling of BT circuit state data over GCI can determine that a duration of BT Activity is below a predetermined limit. At time t1, WLAN DUT circuits can transmit a second CTS-to-Self to ensure the medium is reserved for a BT Active duration.

Operations starting at time t2 show operations like those starting at time t0 in FIG. 2. However, the sampling of BT circuit state data over GCI can again determine that a duration of BT Activity is below a predetermined limit.

At time t3, WLAN DUT circuits can sample BT circuit state data over GCI. However, at this time WLAN DUT circuits make a determination that a duration of BT activity will exceed the predetermined limit. Consequently, at time t4, WLAN DUT circuits can issue a power management transmission. In some embodiments, such a transmission can include a "null" packet having a power management bit set to indicate a "power-down" configuration (PM bit reset to 0). In response to such a transmission, peer WLAN devices can refrain from communicating with WLAN DUT circuits. The power management mode can result in a protection duration from time t5 to time t7 (PM Protection DUR). In some embodiments, a duration of PM Protection DUR can be predetermined. In other embodiments, a duration of PM Protection DUR can be ended by WLAN DUT circuits issuing another power management transmission that indicates the end of the power-down mode.

At time t6, a BT RF Active can indicate BT activity, which can follow from time t5 to time t7, and thus can be protected by the PM protection duration.

A hybrid protection arrangement like that of FIG. 3 can be suitable for BT activity operating at a higher coding rate data transfer (e.g., BLE with S=8) where one "Tx+Rx" pair can be between 2 ms to 35 ms.

In this way, for some transmission activity of coexisting circuits (e.g., below a predetermined duration), WLAN circuits can issue one or more CTS-to-Self frames to reserve the medium for the coexisting circuits. However, for other transmission activity (e.g., over a predetermined duration), WLAN circuits can issue a power management transmission to reserve the medium for a longer time period. Such a power management transmission can improve the medium efficiency for an entire BSS by not blocking the medium for a relatively long duration.

Figure 4:
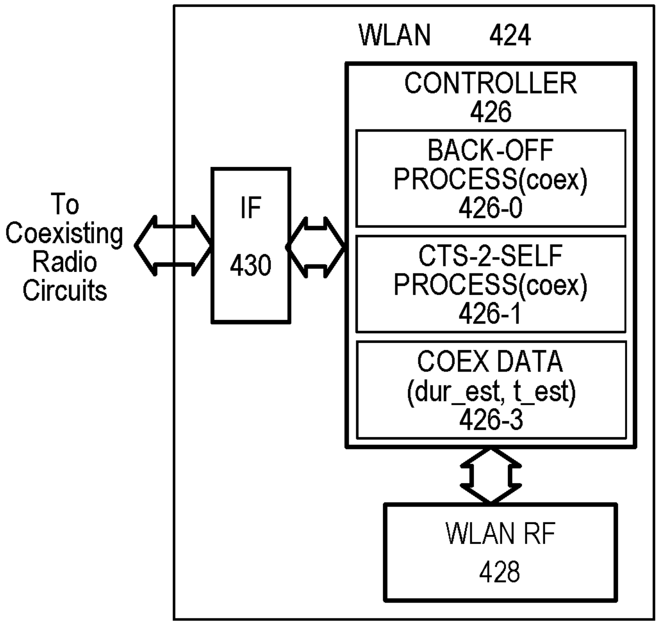
FIG. 4 is a block diagram of WLAN circuits according to an embodiment.

FIG. 4 is a block diagram of WLAN circuits 424 according to an embodiment. WLAN circuits 424 can be part of a device (or system) that includes one or more coexisting radio circuits (not shown) that use the same medium. WLAN circuits 424 can include a controller section 426, radio frequency (RF) section 428 and interface (IF) section 430. A controller section 426 can control wireless communications compatible with one or more IEEE 802.11 wireless standards. A controller section 426 can include circuits configurable to execute various communication functions as described herein, including but not limited to: one or more processors executing instructions, custom logic, programmable logic and combinations thereof.

An RF section 428 can include circuits for receiving and transmitting data over one or more media according to one or more IEEE 802.11 wireless standards. An IF section 430 can enable communication with coex radio circuits, including receiving and/or requesting coex data on future coex activity, as well as receiving an indication when actual coex activity occurs and data on the actual coex activity.

A controller section 426 can include a back-off process for coex transmissions 426-0, a CTS-to-Self process for coex transmissions 426-1 and can store coex data 426-2. A back-off process 426-0 can take any suitable form. In some embodiments, upon receiving coex data over IF section 430, a back-off process 426-0 can determine if any requested WLAN activity extend past an estimated start time of future coex activity, and then execute or not execute such WLAN activity. However, in other embodiments, after receiving coex data, a back-off process 426-0 can cease WLAN operations at the earliest possible time. In this way, a back-off process can help enable WLAN circuits to preserve a medium with a CTS-to-self and/or power management frame.

A CTS-to-Self process 426-1 can generate CTS-to-Self frames in response to coex circuits states. Upon receiving data for future coex activity over IF section 430, a CTS-to-Self process 426-1 can generate data for a CTS-to-Self frame that will result in a duration (e.g., NAV) that is at least as long as the expected coex activity. Such a CTS-to-Self frame can then be transmitted when actual coex activity is indicated, or in other embodiments, at an expected coex activity start time. In some embodiments, upon receiving data for actual coex activity, a CTS-to-Self process 426-1 can determine if a previous CTS-to-Self has a sufficient duration to cover the coex activity. If not, a CTS-to-Self process 426-1 can generate a second CTS-to-Self frame of sufficient duration to cover the coex activity.

Coex data 426-3 can include data received over IF 430 that can be used by back-off and CTS-to-Self processes

426-0/1. Coex data 426-3 can include any of: an estimated duration of future coex activity (dur_est), a duration of actual coex activity (dur_act), and an estimated start time for future coex activity (t_est).

In this way, WLAN circuits can include an interface to receive data indicating future coex radio circuit activity. In response to such data, WLAN circuits can back-off WLAN activity to enable the issuance of one or more CTS-to-Self frames to protect the coex radio activity.

Figure 5:
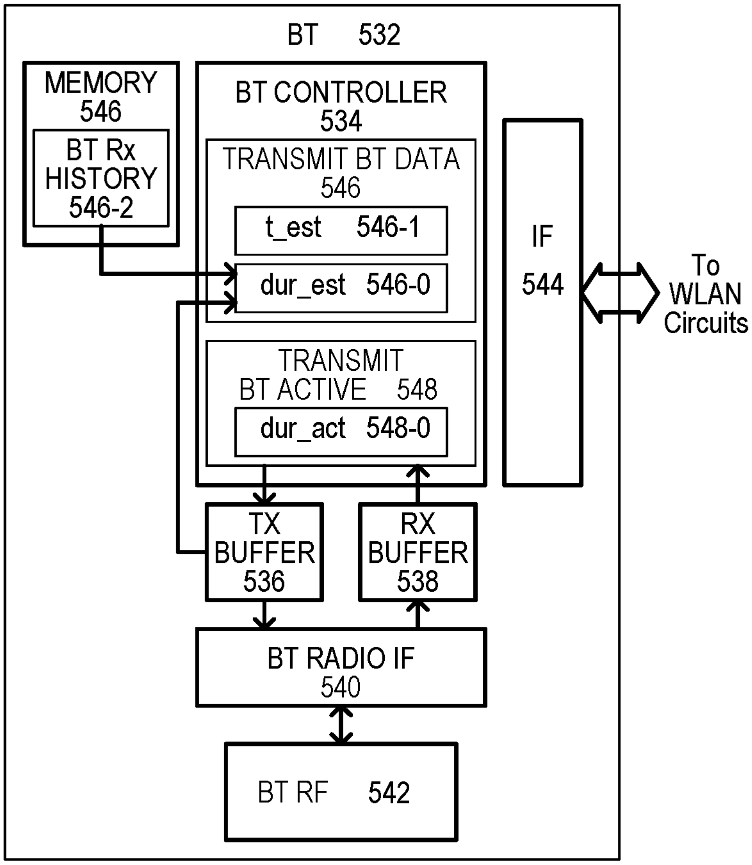
FIG. 5 is a block diagram of coex BT circuits according to an embodiment.

FIG. 5 is a block diagram of coex BT circuits 532 according to an embodiment. BT circuits 532 can be part of a device (or system) that includes WLAN circuits that use the same medium. BT circuits 532 can include a BT controller section 534, a transmit (Tx) buffer 536, receive (Rx) buffer 538, BT radio IF 540, BT radio circuits 542, BT IF section 544 and memory circuits 546. A BT controller section 524 can control wireless communications compatible with one or more BT standards. A BT controller section 534 can include circuits configurable to execute various communication functions as described herein, including but not limited to: one or more processors executing instructions, custom logic, programmable logic and combinations thereof.

Tx buffers 536 can store data for future transmission from BT circuits 532 and Rx buffers 538 can store data wirelessly received by BT circuits 532. A BT radio IF 540 can organize BT data for transmission by BT RF circuits 542, as well as extract data received by BT RF circuits 542. BT RF circuits 542 can include circuits for receiving and transmitting data over one or more media according to one or more BT standards. An IF section 544 can enable communication with WLAN circuits, including the transmission of data on future BT activity, as well as an indication of actual BT activity. Memory circuits 546 can include volatile memory circuits, nonvolatile memory circuits, or combinations thereof. Memory circuits 546 can store data for BT circuits 532, including a history of BT data reception 546-2.

A BT controller section 534 can include a transmit BT data process 546 and a transmit BT active process 548. A transmit BT data process 546 can determine information about future BT activity, and transmit or otherwise make available such data for WLAN circuits. Such information can include, but is not limited to, an estimated duration of a future BT activity (dur_est) 546-0, and in some embodiments, an estimated start time (t_est) for future BT activity 546-1. In the embodiment shown, dur est can be determined from a state of Tx buffer 536 and/or historical data for Rx transmissions 546-2. A transmit BT active process 548 can transmit an indication to WLAN circuits signifying the start of actual BT activity. In some embodiments, such an indication can be accompanied by an actual duration (dur_act) 548-0 for the imminent BT activity.

In this way, BT circuits can determine a duration of future BT activity, and transmit such data to WLAN circuits, followed by an indication corresponding to when such BT activity actually occurs.

According to embodiments, data that can indicate future coex activity can be received by a system, or generated by circuits within such a system.

Figure 6:
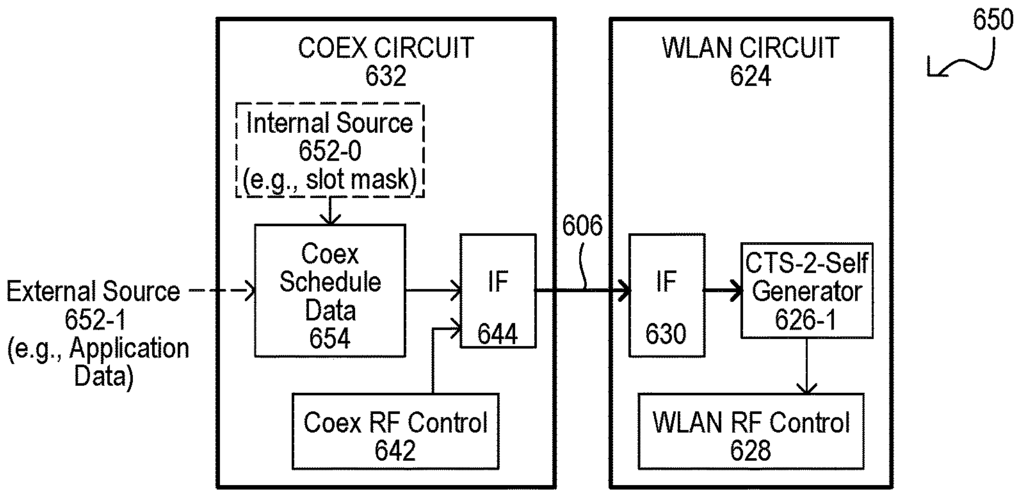
FIG. 6 is a block diagram of a system in which coex circuits can receive schedule data for future coex activity according to an embodiment.

FIG. 6 shows a system 650 according to an embodiment in which coex circuits can receive future coex activity data (e.g., schedule data) from another source, and provide such data to WLAN circuits. A system 650 can include coex circuits 632 in communication with WLAN circuits 624 over a communication path 606.

In operation, coex circuits 632 can receive coex schedule data 654 from any suitable source, including but not limited to, an internal source 652-0 or an external source 652-1. Coex schedule data 654 can be data related to future coex activity as described herein and equivalents. An internal source 652-0 can provide any suitable data values or signals that can indicate future activity for coex circuits. In some embodiments, an internal source 652-0 can include a transmit buffer state or a slot mask (e.g., BT slot mask). An external source 652-1 can include an application executed by other portions (not shown) of the system 650.

Coex schedule data 654 can be transmitted over communication path 606 to WLAN circuits 624 via coex IF section 644 and WLAN IF section 630. Within WLAN circuits 624, a CTS-to-Self generator 626-1 can generate one or more CTS-to-Self frames having a duration sufficient to cover the duration of coex activity indicated by coex schedule data.

When coex circuit 632 is going to be active on a shared medium, coex RF control circuits 642 can generate a coex active indication which can be received by WLAN circuits 624. In response, WLAN RF control circuits 628 can issue the CTS-to-Self frame. Further, a second CTS-to-Self frame can be generated in the event a duration of the first is not sufficient to protect the coex activity.

In this way, coex circuits can receive future coex activity data that can be accessed by WLAN circuits to generate a protective CTS-to-Self for the coex activity.

Figure 7:
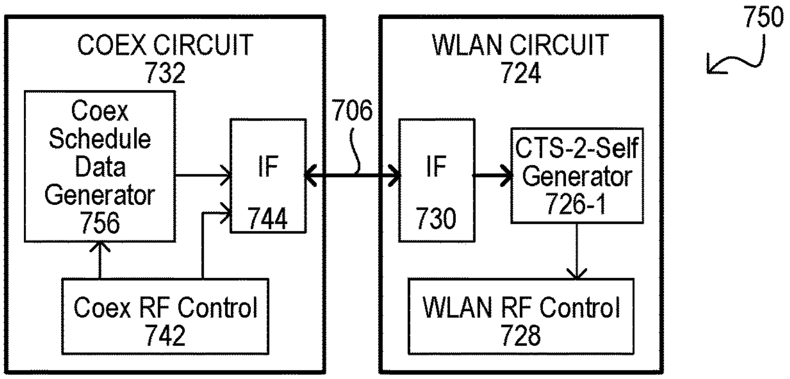
FIG. 7 is a block diagram of a system in which coex circuits can generate schedule data for future coex activity according to an embodiment.

FIG. 7 shows a system 750 according to an embodiment in which coex circuits can develop future coex activity data using past coex activity, and provide such data to WLAN circuits. System 750 can include items like those in FIG. 6, such like items are referred to by the same reference character but with leading digit being a "7" instead of "6".

In operation, a coex schedule data generator 756 can monitor activity of coex RF control circuits 742, and from such data determine future coex activity data. Such operations can include any of those described herein, including accumulating and evaluating historical data or including such historical data as training data for an artificial intelligence system. Coex schedule data can be used by CTS-to-self generator 726-1 to generate one or more CTS-to-self frames to protect future coex activity, as described herein or equivalents.

In this way, coex circuits can generate future coex activity data from past coex activity that can be accessed by WLAN circuits to generate one or more protective CTS-to-Self frames for the coex activity.

Figure 8:
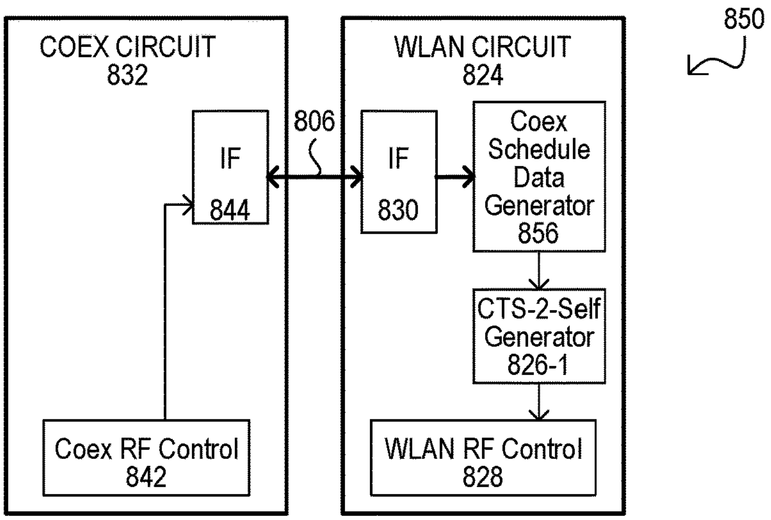
FIG. 8 is a block diagram of a system in which WLAN circuits can generate schedule data for future coex activity according to an embodiment.

FIG. 8 shows a system 850 according to an embodiment in which WLAN circuits can develop future coex activity data using past coex activity. System 850 can include items like those in FIG. 7, such like items are referred to by the same reference character but with leading digit being an "8" instead of "7".

In operation, when coex circuits 832 are active, data regarding such coex activity can be forwarded to WLAN circuits over IF sections 844/830. Within WLAN circuits 824, a coex schedule data generator 856 can evaluate received past coex data to generate future coex schedule data according to any of the embodiments described herein or an equivalent. Such future coex schedule data can be used by CTS-to-self generator 826-1 to generate one or more CTS-to-self frames to protect future coex activity, as described herein or equivalents.

In this way, WLAN circuits can receive coex activity data from the past to determine future coex activity. Such data can be used by the WLAN circuits to generate one or more protective CTS-to-Self frames for the coex activity.

Embodiments can include coex circuits in communication with WLAN circuits according to any suitable communication path that can enable WLAN circuits to receive future coex activity data as well as an indication of actual coex activity. In some embodiments, coex circuits can communicate via a serial bus according to one or more serial data protocols.

Figure 9:
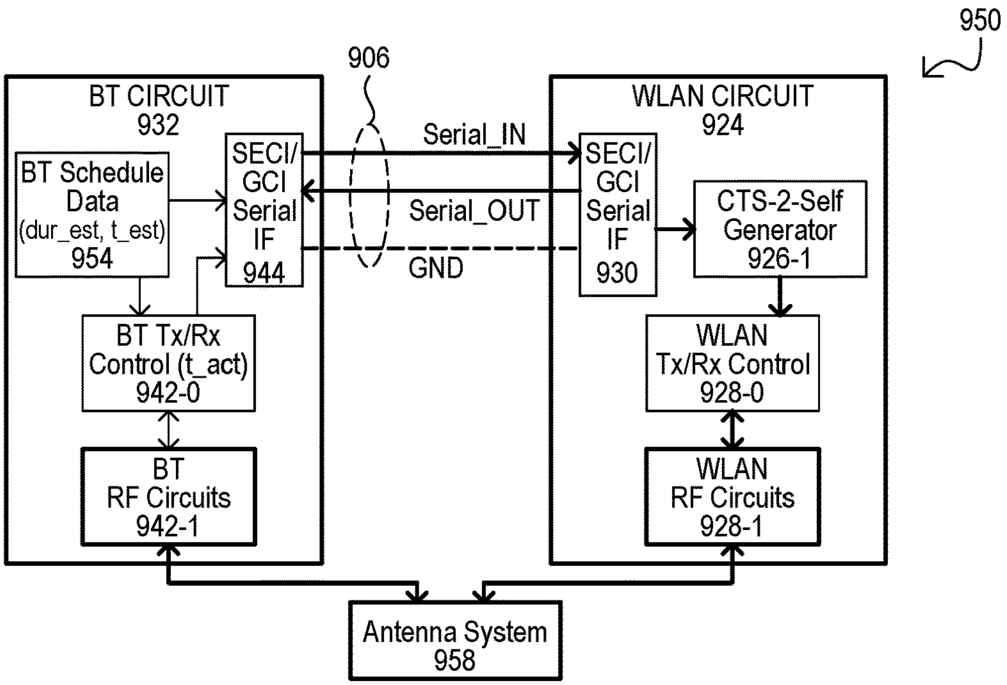
FIG. 9 is a block diagram of a system in which coex circuits can provide future activity data to WLAN circuits over a serial bus according to embodiments.

FIG. 9 is a block diagram of a system 950 according to an embodiment. A system 950 can include WLAN circuits 924, BT circuits 932 and an antenna system 958. WLAN circuits 924 and BT circuits 932 can communicate over an interface designed for providing communication between WLAN circuits 924 and co-located radio circuits.

BT circuits 932 can include BT schedule data 954, BT Tx/Rx control circuits 942-0, BT RF circuits 942-1 and a coex IF 944. BT schedule data 954 can include information on future BT activity, and can be generated according to any of the methods described herein or equivalents. BT schedule data 954 can include dur_est, and optionally, t_est values. Such values (dur_est, t_est) can be transmitted over serial bus 906 to WLAN circuits 924. In some such data can be transmitted in response to a request from WLAN circuits 924. BT Tx/Rx circuits 942-0 can control BT transmissions, and can indicate to WLAN circuits 924 when actual BT transmissions occur (t_act). BT RF circuits 942-1 can be connected to an antenna system 958, and can transmit/receive BT transmissions. Coex IF 944 can be an interface designed for exchanging data between co-located wireless circuits, including a serial enhanced coexistence interface (SECI), which can be a two-wire interface, or a GCI, which can be a three wire interface.

WLAN circuits 924 can include a WLAN coex IF 930, CTS-to-self generator 926-1, WLAN Tx/Rx control circuits 928-0 and WLAN RF circuits 928-1. A WLAN coex IF 930 can correspond to that of coex IF 944, including being an SECI and/or GCI. A CTS-to-self generator 926-1 can generate one or more CTS-to-Self frames in response to BT schedule as described herein and equivalents. WLAN Tx/Rx circuits 928-0 can control WLAN transmissions. WLAN RF circuits 928-1 can be connected to an antenna system 958, and can transmit/receive WLAN transmissions.

In this way, coex systems can transmit coex (e.g., BT) schedule data to WLAN circuits over interfaces designed for communication between coexisting circuits, including but not limited to, SECI and GCI.

Embodiments can include coex circuits in communication with WLAN circuits with interfaces modified to utilize existing serial buses to transmit future coex activity data to WLAN circuits. In some embodiments, coex circuits can communicate via a three wire serial bus.

Figure 10:
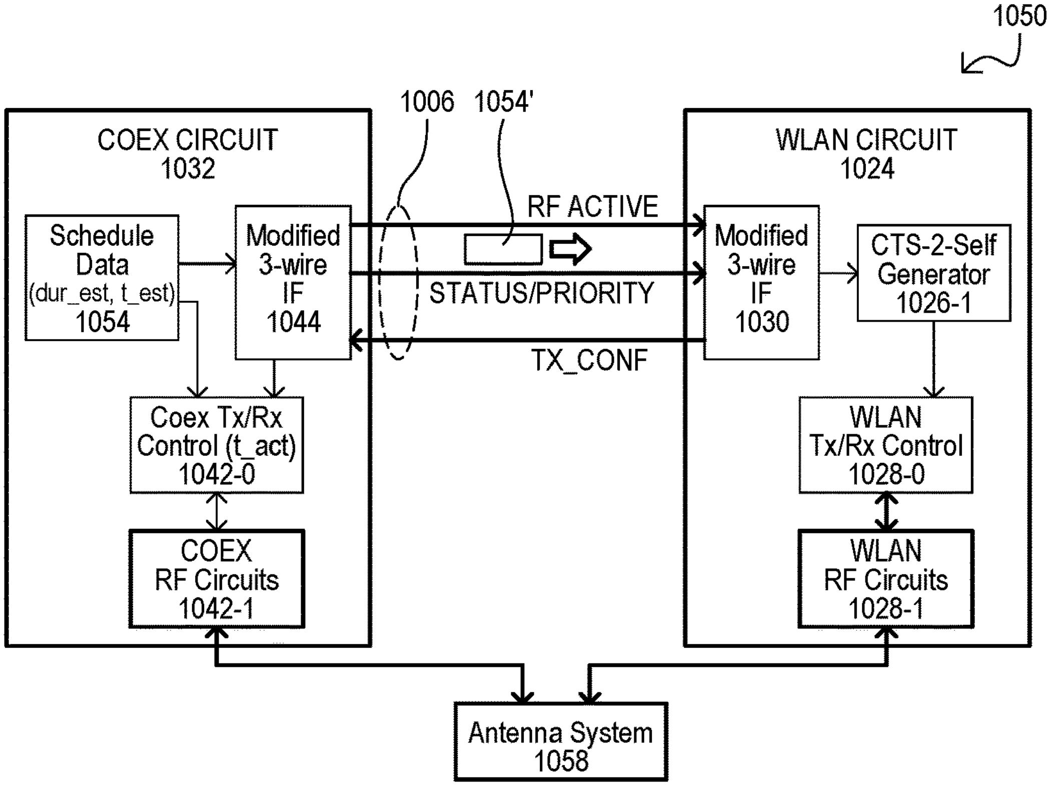
FIG. 10 is a block diagram of a system in which coex circuits can provide further activity data to WLAN circuits over a two- or three-wire bus according to embodiments.

FIG. 10 is a block diagram of a system 1050 according to an embodiment. A system 1050 can include items like those of FIG. 9, and such like items are referred to by the same reference character but with leading digits being "10" instead of "9".

A system 1050 can differ from that of FIG. 9 in that coex circuits 1032 can be in communication with WLAN circuits 1024 over a three-wire bus 1006. A three wire bus can include an RF active line and STATUS/PRIORITY line to transmit data from coex circuits 1032 to WLAN circuits 1024, and a transmit confirm (TX_CONF) line to transmit data from WLAN circuits 1042 to coex circuits 1032. However, the interfaces to such a bus (1044/1030) can be modified to carry future coex activity data (e.g., coex schedule data) 1054' from coex circuits 1032 to WLAN circuits 1024. Such data can be carried on the STATUS/PRIORITY line, RF ACTIVE line or both. Further, in some embodiments, WLAN circuits 1024 can issue requests for coex schedule data over a TX_CONF line. In some embodiments, RF ACTIVE can indicate actual coex activity following the transmission of coex schedule data.

In this way, coex systems can transmit coex schedule data to WLAN circuits over existing serial bus types, including three wire buses, using modified bus interfaces.

Figure 11:
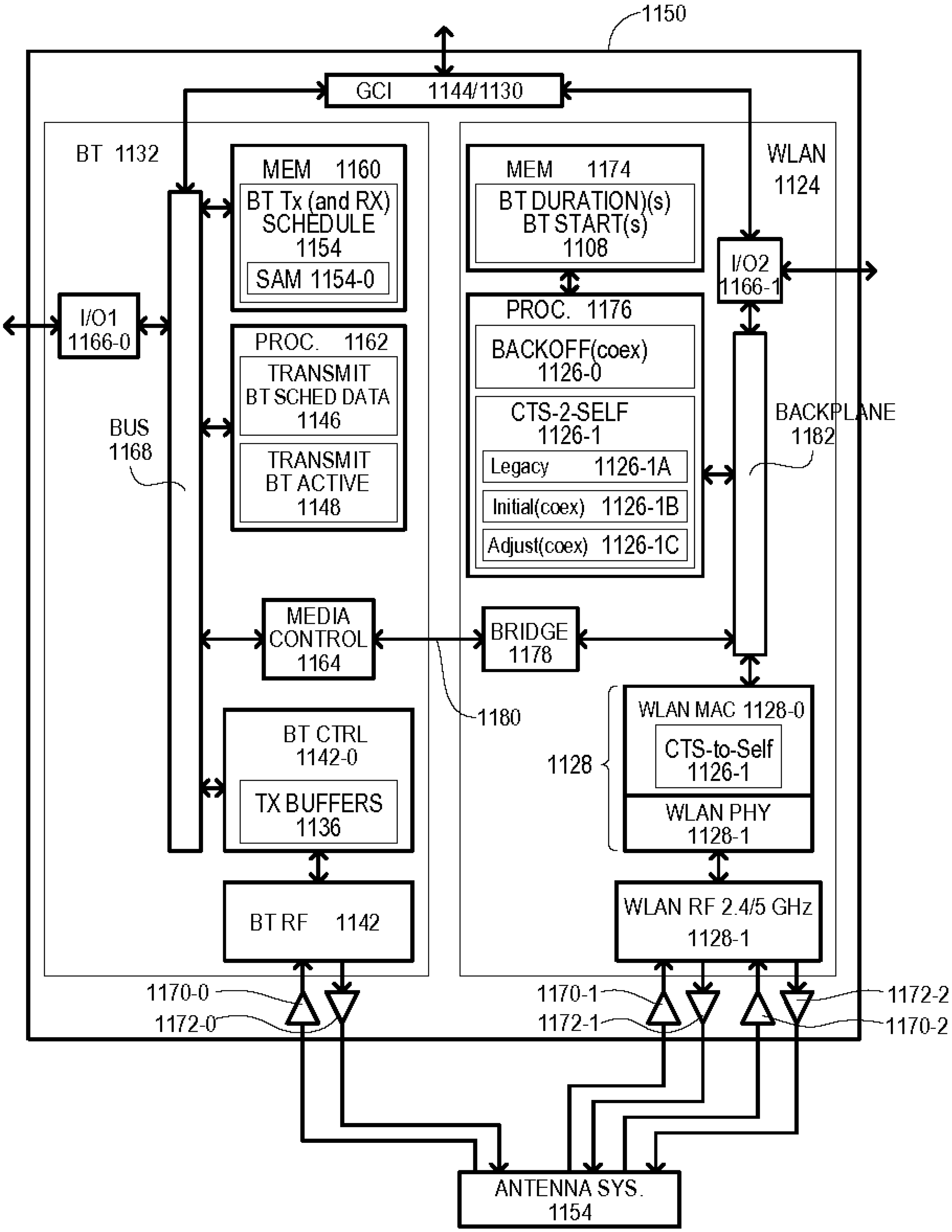
FIG. 11 is a block diagram of a system according to another embodiment.

FIG. 11 is a block diagram of a system 1150 according to an embodiment. In some embodiments, system 1150 can be an implementation of any of those shown in FIGS. 1A to 1E or FIGS. 4 to 10. A system 1150 can include a BT circuits 1132, WLAN circuits 1124 and an antenna system 1154. BT circuits 1132 can include a BT processor section 1162, a BT memory section 1160, media control circuits 1164, first I/O circuits 1166-0, and BT RF circuits 1142.

A BT processor section 1162 can execute instructions for BT operations, including a transmit BT schedule function 1146 that can transmit future BT activity data to WLAN circuits 1124 and a transmit BT active function 1148 that can transmit a BT active indication to WLAN circuits 1124. A BT memory section 1160 can store data for BT future activity, including BT schedule data 1154. BT schedule data 1154 can include data on future BT transmissions, and in some embodiments, data on future BT receptions. In some embodiments, BT schedule data 1154 can include, or can be derived from a slot allocation mask 1154-0. As noted herein, future BT transmissions can be determined using a state of transmit buffers 1136.

BT control circuits 1142-0 can include circuits for performing functions according to one or more BT standards, and can include BT Tx buffers 1136, from which a BT activity duration can be determined.

BT RF circuits 1142 can be controlled by BT control circuits 1142-0 and can include radio circuits to enable transmission of packets according to one or more BT standards. In the embodiment shown, BT RF circuits 1142 can drive one or more BT power amplifiers (PA) 1172-0 and receive input signals from a BT low noise amplifier (LNA) 1170-0.

Media control circuits 1164 can communicate with WLAN circuits 1124 over bridge 1180 to control access to a transmission media (e.g., 2.4 GHz band). First I/O circuits 1166-0 can enable communication with system 1150 according to any of the embodiments described herein or equivalents.

BT processor section 1160, BT memory section 1162, BT control circuits 1142-0, media control circuit 1164, and first I/O circuits 1166-0 can communicate with one another over a bus 1168.

WLAN circuits 1124 can include a processor section 1176, a memory section 1174, second I/O circuits 1166-1, bridge control circuit 1178, WLAN control circuits 1128 and WLAN radio circuits 1128-1. A processor section 1176 can execute instructions for WLAN operations, including a back-off operation 1126-0 and CTS-to-self operations 1126-1. A back-off operation 1126-0 can, in response to receiving data regarding future BT activity, refuse to perform WLAN operations. In some embodiments, such an operation can make a determination as whether a WLAN operation can be executed before an estimated start time for future BT activity. CTS-to-self operations 1126-1 can generate and issue conventional CTS-to-self frames 1126-1A for the accommodation of legacy WLAN versions. However, in addition,CTS-to-self operations 1126-1 can generate and issue initial CTS-to-self frames 1126-1B to protect expected BT activity, as described herein. Further, adjustment CTS-to-self frames 1126-1C can be generated and issued to extend a protection duration in the event a duration of the initial CTS-to-self frame 1126-1B is too short.

Second I/O circuits 1166-1 can enable communication with the system 1150 according to any of the embodiments described herein or equivalents, including communications with BT circuits 1104 over an interface 1144/1130, which can be a GCI and/or SECI. In some embodiments, BT processor section 1162 can transmit BT schedule data and transmit active indications via interface 1144/1130. In some embodiments, interface 1144/11130 can enable a system to interface with other wireless systems, such as cellular network systems, including but not limited to 3G, 4G, LTE and 5G networks.

WLAN control circuits 1128 can include circuits for performing functions according to one or more IEEE 802.11 wireless standards, including those operating in the 2.4 and 5 GHz band. In some embodiments, this can include IEEE 802.11 compatible media access control (MAC) layer circuits 1128-0 and IEEE 802.11 compatible physical interface layer (PHY) circuits 1128-0 and WLAN PHY circuits 1128-1. WLAN RF circuits 1128-1 can include multi-band radio circuits that transmit and receive data on one or more WLAN bands (e.g., 2.4 GHz, 5 GHz). In the embodiment shown, WLAN RF circuits 1128-1 can drive one or more 2.4 GHz band PA(s) 1172-1, a 5 GHz band PA 1172-2, and receive input signals from a 2.4 GHz LNA 1170-1 and a 5 GHz LNA 1170-2.

Processor section 1176, bridge control circuit 1178, and WLAN control circuits 1128 can be connected to one another over a backplane 1182.

System 1150 can be connected to an antenna system 1154. Antenna system 1154 can include one or more physical antennas, as well as switches for enabling different connections to such antennas.

In some embodiments, a system 1150 can include BT circuits 1132 and WLAN circuits 1124 formed with a same integrated circuit substrate.

In some embodiments, coex circuits or WLAN circuits can include a coex schedule data generator, which can generate data for future coex activity from past coex activity data.

Figure 12:
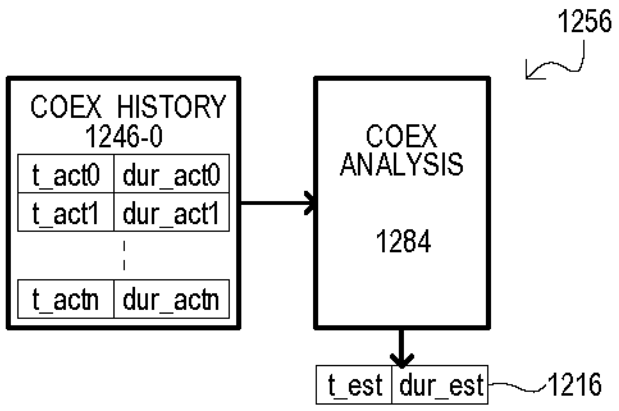
FIG. 12 is a diagram of a coex activity data generator according to an embodiment.

FIG. 12 is a block diagram of coex schedule generator 1256 according to an embodiment. A coex schedule generator 1256 can include past coex activity data 1246-0 and coex analysis section 1284. While FIG. 12 shows past coex activity durations (dur_act0 to dur_actn) and start times (t_act0 to t_actn), such data 1246-0 can take any other form suitable for deriving future coex activity. Coex analysis section 1284 can generate estimated future coex activity data 1216 from past coex activity data 1246-0 according to any suitable manner. Such analysis can include, but is not limited to, a simple analysis such as averaging time between coex activity in a certain range and/or averaging coex durations. However, as shown herein, such analysis can include more complex algorithms including machine learning.

In this way, coex circuits and/or WLAN circuits can use historical coex activity data to derive estimated future coex activity data which can be used by WLAN circuits to generate one or more protective CTS-to-self frames.

Figure 13A:
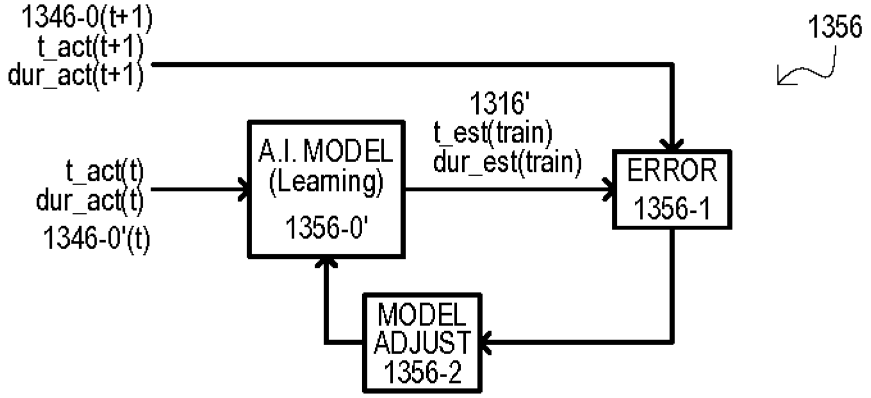
FIGS. 13A and 13B are diagrams of a coex activity data generator according to another embodiment.
Figure 13B:
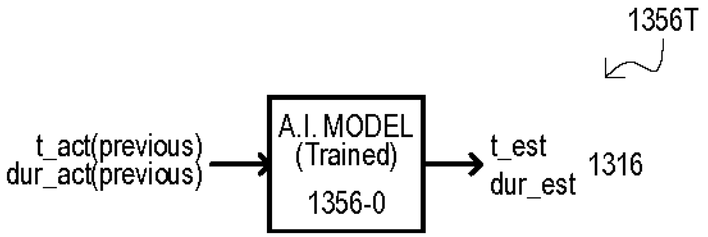

According to embodiments, data for future coex activity can be generated with a machine learning system. FIGS. 13A and 13B show an example of such an embodiment. FIGS. 13A and 13B are block diagrams of a coex schedule generator system 1356 according to another embodiment. A system 1356 can include a model 1356-0', error function 1356-1 and parameter adjust section 1356-2. A model 1356-0' can be a learning model, including any suitable neural network, for example. A model 1356-0' can generate output values 1316' in response to training data 1346-0. Model 1356-0' can vary how it generates output values 1316' according to adjustable parameters (e.g., neuron weights). In the embodiment shown, model 1356-0' can be trained with training data sets that include inputs 1346-0' and outputs 1346-0(*t*+1). In the embodiment shown, training data can be historical coex activity data 1346-0(*t*)/(t+1). Output data can be activity data 1316' predicted by the model 1356-0' during training.

An error function 1356-1 can compare output values 1316' from model 1356-0' with training output values 1346-0(*t*+1), to generate an error value. An error function 1356-1 can base error on the desired feature for improvement/optimization. Parameter adjust section 1356-2 can adjust parameters of model 1356-0' in response to error values generated by error function 1356-1. Such parameter adjustments can be made to reduce the error (e.g., improve desired feature) and can take any suitable form, such as a version of gradient descent in the case of some neural network models.

FIG. 13B shows an operation for generating estimated future coex activity in response to previous coex activity. A system 1356T can include a model 1356-0 after training. Parameters of model 1356-0 have been learned to generate an inferred future coex activity 1316.

All or a portion of systems 1356/1356T can be located on a system/device that includes coex circuits and WLAN circuits, or can be remote from such a system (e.g., a server system). In one embodiment of the latter case, a system can include a trained model 1356-0. However, other embodiments can include models that are trained as the system/device operates (e.g., acquired coex historical data).

In this way, a system having coex circuits with WLAN circuits that can generate estimated future coex activity with a machine learning system. Such estimated future coex activity data can be used by WLAN circuits to generate one or more protective CTS-to-self frames for the future coex activity.

Figure 14:
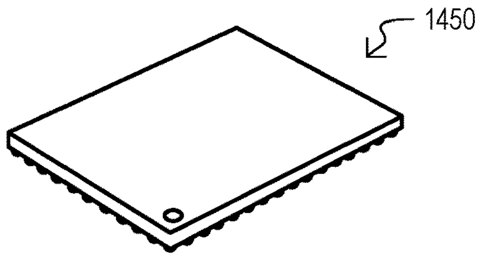
FIG. 14 is block diagram of an integrated circuit combination device according to an embodiment.

While embodiments can include systems and devices with various interconnected components, embodiments can also include unitary devices having coex circuits and WLAN circuits with low passive isolation. In some embodiments, such unitary devices can be advantageously compact single integrated circuits (i.e., chips). FIG. 14 show one particular example of a packaged single chip wireless combination device 1450. Such a device 1450 can include one or more coex circuits (e.g., BT, Zigbee, Thread) and WLAN circuits that can generate CTS-to-self protection frames for coex activity as described herein and equivalents. In some embodiments, a device 1450 can include circuits like those shown in any of FIGS. 4-11.

However, it is understood that a device according to embodiments can include any other suitable integrated circuit packaging type, as well as direct bonding of a device chip onto a circuit board or substrate.

Figure 15:
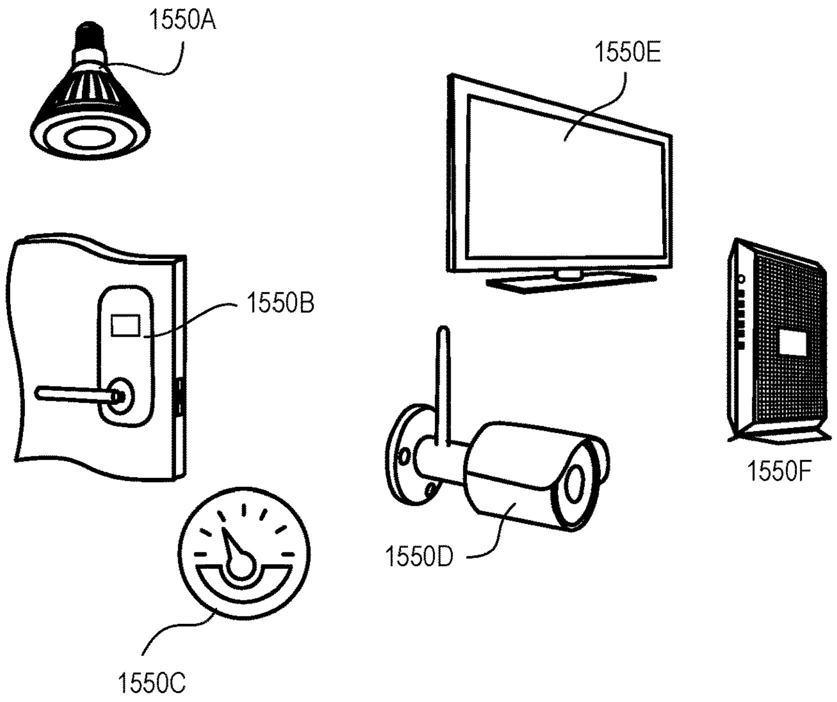
FIG. 15 is a diagram showing various devices according to an embodiment.

While embodiments can include single integrated circuit devices, embodiments can include larger devices which an improve the performance of coexisting radio circuits the share the same medium. FIG. 15 shows various systems according to embodiments. Such systems can include WLAN circuits capable of issuing CTS-to-self frames, as well as one or more coex circuits.

In some embodiments, systems can include Internet-of-things (IoT) type devices, that are wireless capable, including but not limited to: lighting devices 1550A, locking devices 1550B, instrumentation devices 1550C, security devices 1550D and entertainment devices 1550E. In some embodiments, a system can be a gateway or router device

1550F that can serve as an access point (AP) for a BSS, but include another coex wireless circuit.

In this way, embodiments can include IoT type devices, as well as devices that can serve as APs in a BSS.

Figure 16:
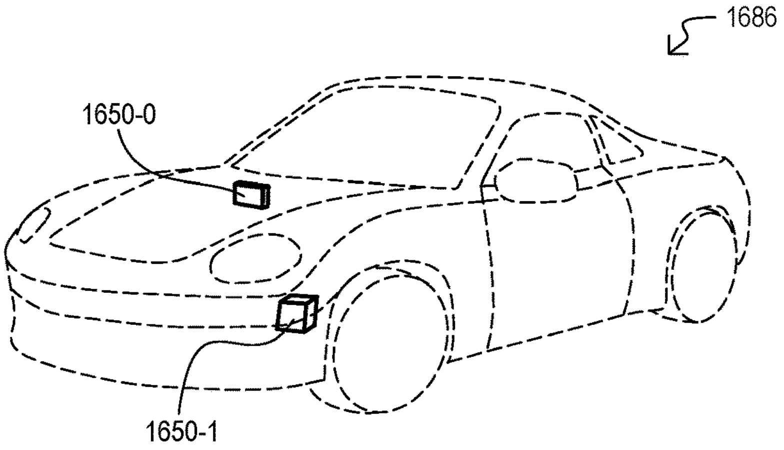
FIG. 16 is a diagram showing automobile systems according to embodiments.

Embodiments can enjoy application in subsystems of motor vehicles to enable multiple communication types, including WLAN and one or more coexisting protocols. FIG. 16 shows a motor vehicle system 1686 according to another embodiment. A motor vehicle system 1686 can include various subsystems, including but not limited to an infotainment subsystem 1650-0 and/or an electronic control unit (ECU) 1650-1. A subsystem (1650-0/1) can include WLAN circuits that can issue CTS-to-self frames to protect one or more coex circuits, as described herein or equivalents.

In this way, automobiles can include combination devices with WLAN circuits that share a medium with one or more coex circuits, as described herein and equivalents.

While the operations, devices and systems descried herein disclose various methods according to embodiments, additional methods will be described with reference to flow diagrams.

Figure 17:
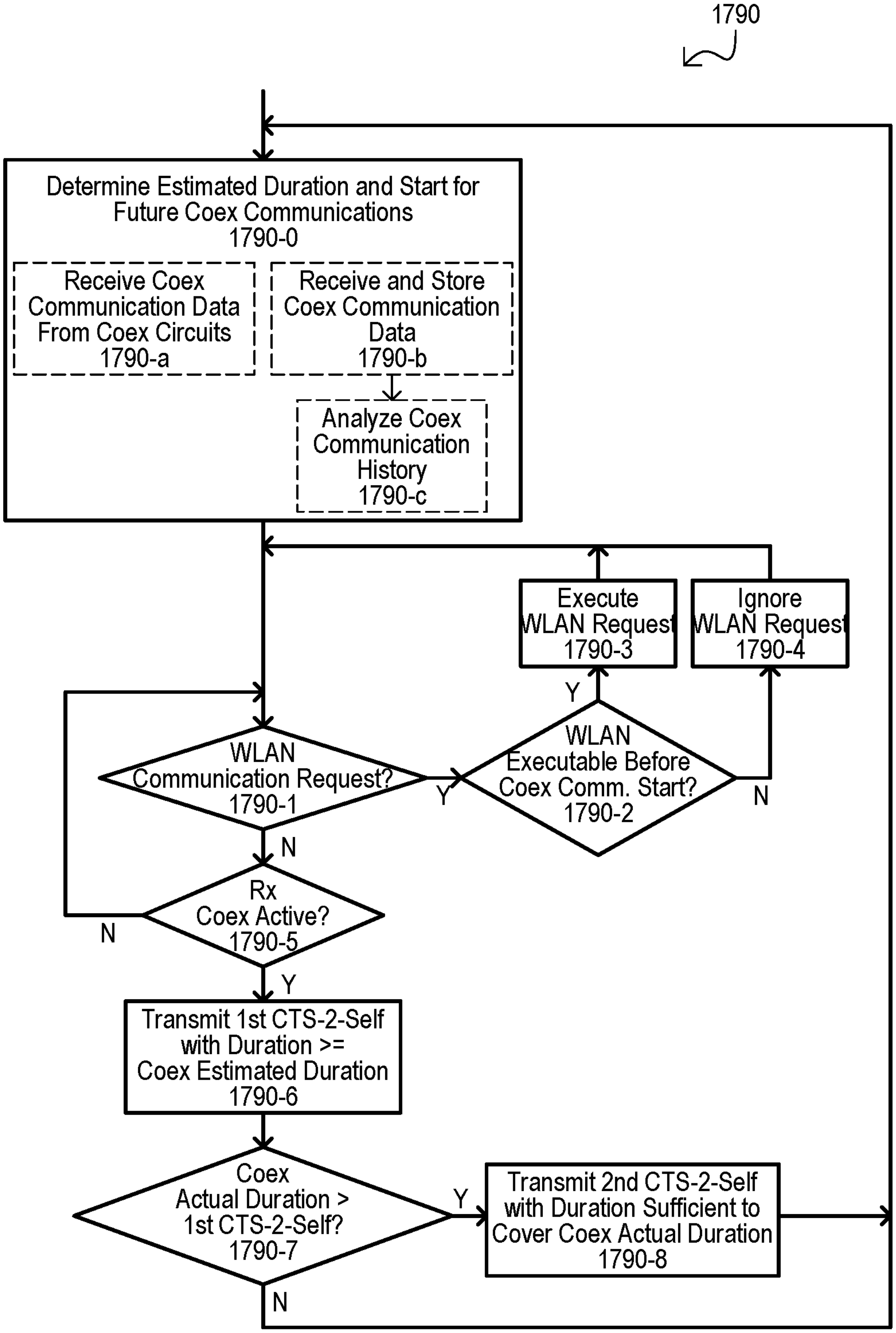
FIG. 17 is a flow diagram of a method according to an embodiment.

FIG. 17 is a flow diagram of a method 1790 according to an embodiment. A method 1790 can be executed by WLAN circuits that share a medium with coex circuits. A method 1790 can include determining estimated duration and estimated start for future coex communications 1790-0. Such an action can include receiving coex communication data from coex circuits 1790-*a*. In addition or alternatively, a method 1790 can include receiving and storing coex communication data from coex circuits 1790-*b* and then analyzing coex communication history 1790-*c* to arrive at estimated future coex activity.

A method 1790 can determine if a WLAN communication request is received 1790-1. Such an action can include WLAN circuits receiving communications from other devices, including but not limited to: detecting a request to send from a peer device of network. However, such an action can also include an internal request (e.g., an application serviced by the WLAN circuits). If a WLAN communication request is received (Y from 1790-1), a determination can be made as to whether the requested communication can be completed before a future coex communication (e.g., before an estimated start time) 1790-2.

If a requested WLAN communication is determined to be completable before a future coex communication (Y from 1790-2), a method 1790 can execute such WLAN communication 1790-3. Such an action can include issuing an acknowledgement (ACK) for the request. If a requested WLAN communication is determined to not be completable before a future coex communication (N from 1790-2), a method 1790 can ignore the WLAN request 1790-4. Such an action can include not returning an acknowledgement for the WLAN communication request. A method 1790 can continue to make such determinations in response to WLAN requests until a coex active indication is received (N from 1790-5).

A coex active indication (Y from 1790-5) can indicate coex activity is taking place or is imminent. Such an indication can take any suitable form, and in some embodiments can be a message transmitted from coex circuits (e.g., serial data or a dedicated signal). However, such an indication can be determined by WLAN circuits reading a state of coex circuits (e.g., reading a register or memory location).

In response to receiving a coex active indication (Y from 1790-5), a first CTS-to-self can be transmitted having a duration equal to or greater than an estimated duration of the coex activity 1790-6. In some embodiments, a method 1790 can also include determining if an actual duration of the coex activity is greater than a duration of a first CTS-to-self 1790-7. If it is (Y from 1790-7), a second CTS-to-self can be transmitted having a duration sufficient to cover the actual coex duration 1790-8. A method can then return to 1790-0. If a duration of a first CTS-to-self 1790-7 is sufficient to cover coex activity (N from 1790-7), a method can return to 1790-0.

In this way, a CTS-to-self frame can be generated having a duration greater than or equal to a duration of future coex circuit activity.

Figure 18:
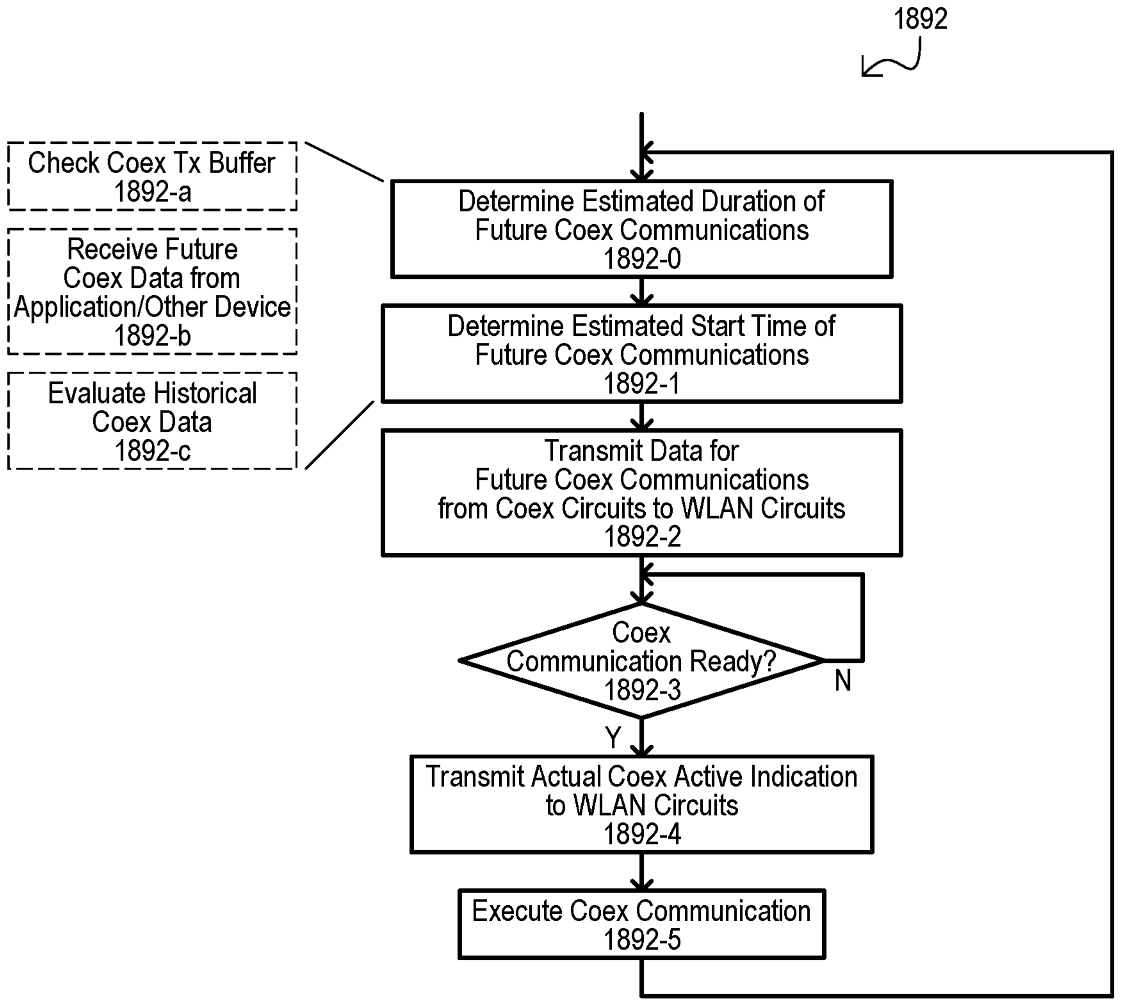
FIG. 18 is a flow diagram of a method according to another embodiment.

FIG. 18 is a flow diagram of a method 1892 according to another embodiment. A method 1892 can be executed by coex circuits that share a medium with WLAN circuits. A method 1892 can include determining an estimated duration 1892-0 and an estimated start for future coex communications 1892-1. Such an action can include any of those described herein, or equivalents, including but not limited to: checking a coex buffer state 1892-*a*, receiving data on future coex activity from an application or other device 1892-*b* and/or evaluating historical coex data 1892-*c*.

Data for future coex communications can be transmitted to WLAN circuits 1892-3. Such an action can include any of those described herein or equivalents, including transmitting such data over a serial bus. When a coex communication is ready (Y from 1892-4), a method 1892 can transmit an active indication to WLAN circuits 1892-5. Such an action can include any of those described herein or equivalents. A method 1892 can then execute the coex communication corresponding the future coex communication 1892-6.

In this way, coex communications can transmit estimated data for future coex communications as well as an active indication when such communications commence.

Figure 19:
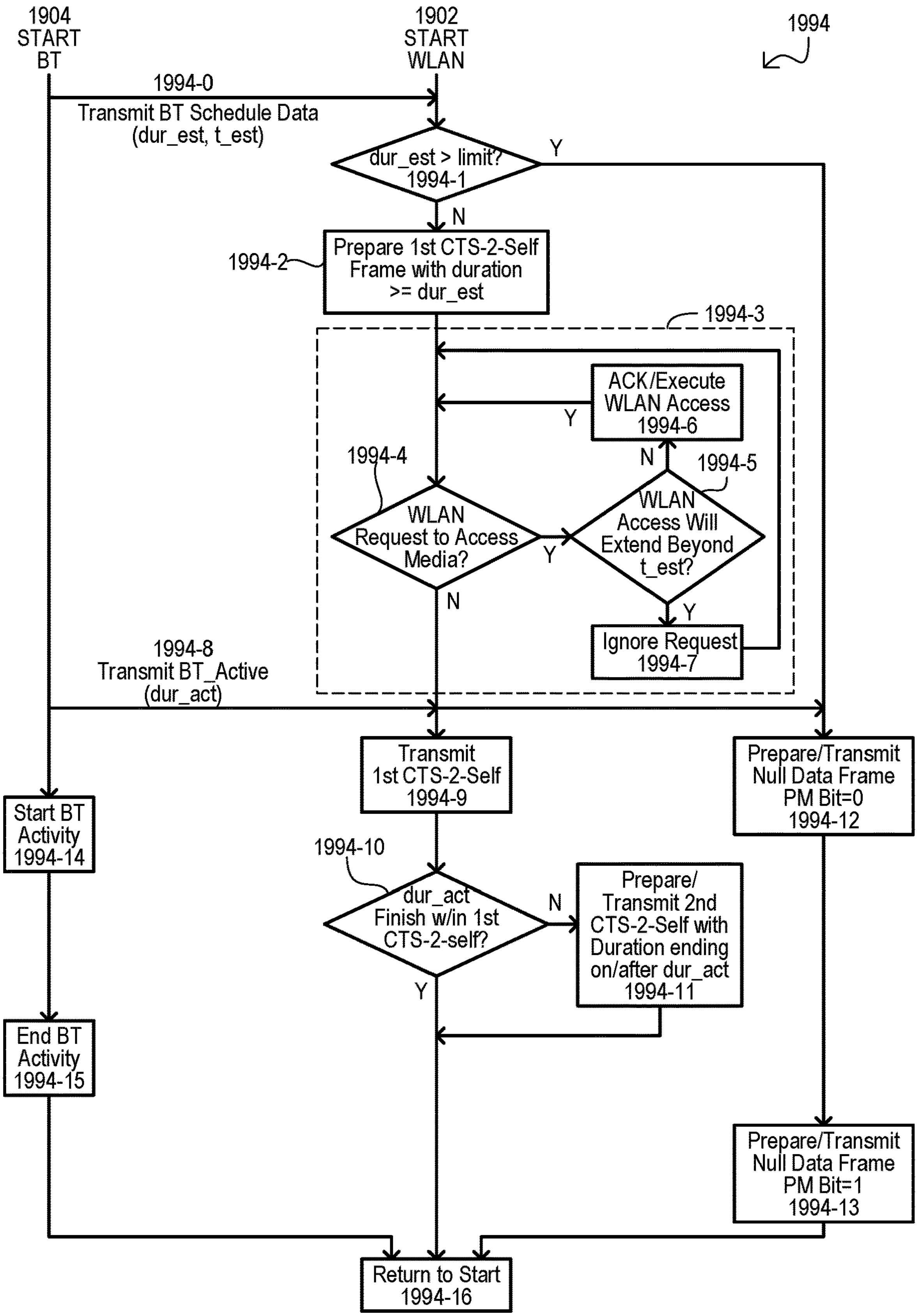
FIG. 19 is a flow diagram of a method according to a further embodiment.
Figure 20:
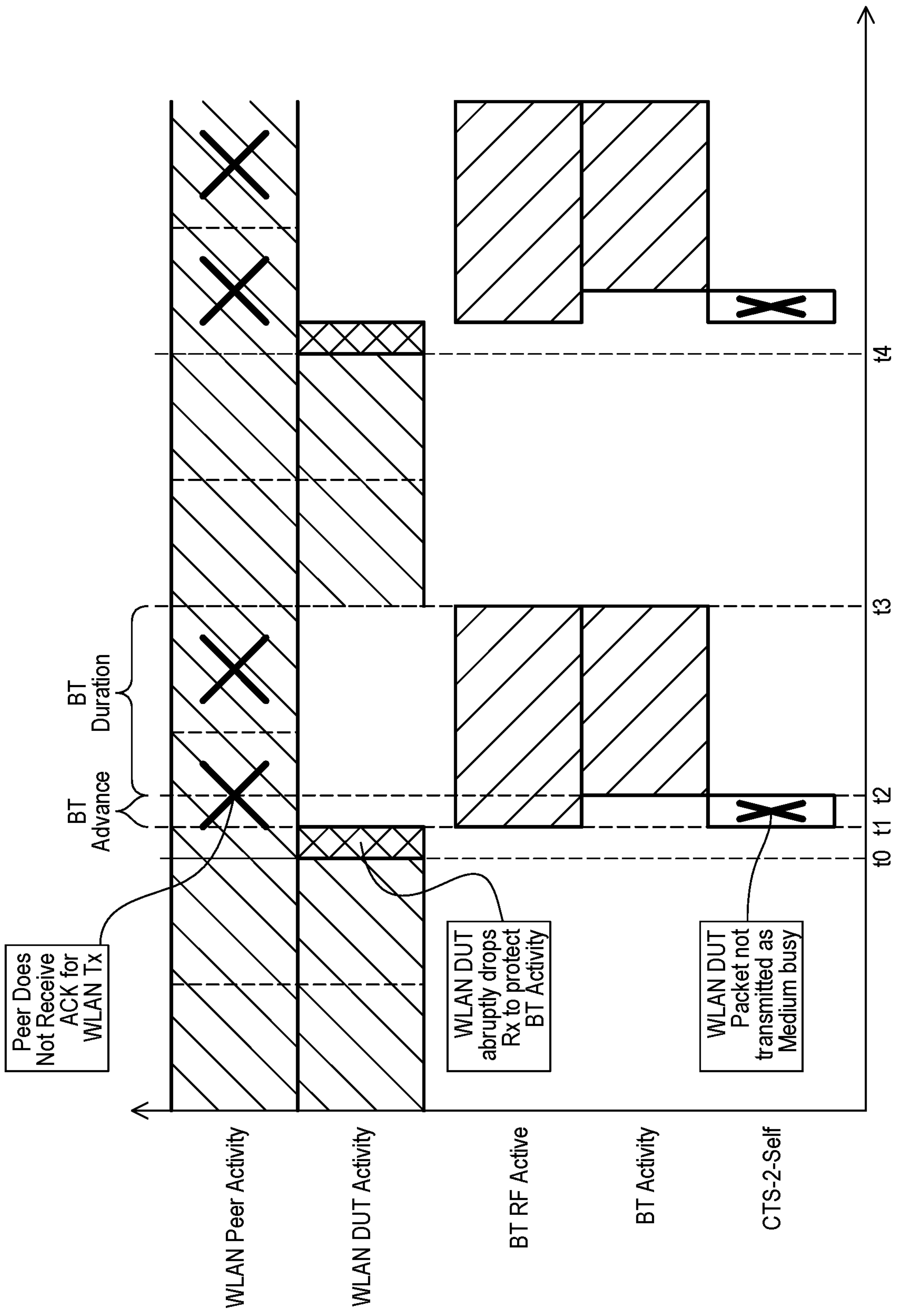
FIG. 20 is a timing diagram showing a conventional approach to generating CTS-to-self frames in response to coex BT activity.

FIG. 19 is a flow diagram of a method 1994 according to another embodiment. A method 1994 can include actions taken by BT circuits 1904 and WLAN circuits 1902. BT circuits 1904 can transmit BT schedule data 1994-0 to WLAN circuits 1902. Such schedule data can include information on future BT activity, and in some embodiments can include an estimated duration (dur_est) and estimated start time (t_est).

WLAN circuits 1902 can determine if a duration of future BT activity is greater than predetermined limit 1994-1. If a duration is not longer than the limit (N from 1994-1), WLAN circuits 1902 can prepare a first CTS-to-self frame with a duration greater than the estimated BT activity duration 1994-2.

A method 1994 can include WLAN circuits determining whether requested WLAN access can be completed before future BT activity 1994-3. In some embodiments, such an action can include determining if a WLAN request to access media is received 1994-4. In some embodiments, such an action can include detecting a request to send from another device. If such a request is received (Y from 1994-4), WLAN circuits 1902 can determine if the requested WLAN access will extend beyond the estimated BT start time 1994-5. If not (N from 1994-5), the WLAN access will be executed and acknowledgement generated 1994-6. If so (Y from 1994-5), the WLAN access can be ignored (e.g., not executed) 1994-7.

BT circuits 1904 can transmit BT active indication 1994-8 to WLAN circuits. In some embodiments such an action can enable WLAN circuits to determine an actual BT duration (dur_act). BT activity can then start 1994-14 and subsequently end 1994-15.

If the estimated BT duration is below the predetermined limit (N from 1994-1), WLAN circuits can transmit a first CTS-to-self 1994-9. WLAN circuits 1902 can determine if an actual duration of BT activity can fit within the first CTS-to-self 1994-10. If not (N from 1994-10), a second CTS-to-self can be prepared and transmitted that can cover an actual BT activity duration 1994-11. After BT activity ends 1994-15, a method 1994 can then return to start 1994-16.

If the estimated BT duration is over the predetermined limit (Y from 1994-1), WLAN circuits 1902 can prepare and transmit a null data frame with a power management bit set to "0" (1994-12). After BT activity ends 1995-15, WLAN circuits 1902 can prepare and transmit a null data frame with a power management bit set to "1" (1994-13). A method 1994 can then return to start 1994-16.

In this way WLAN circuits can issue CTS-to-self frames or transmit a power management state to protect coex BT circuit transmissions.

Embodiments can include WLAN circuits that issue CTS-to-self frames or WLAN power management communications to protect coex circuits that directly share a medium by transmitting and receiving on the same frequencies. However, embodiments can also include WLAN circuits that issue such communications to prevent the generation of harmonic frequencies that can interfere with coex communications.

Advancing protection for coex circuits as described herein can help to improve the success rate of such protection, and thereby lessen chances for the peer to mis-interpret to scale down a coding rate (e.g., MCS index). This can help to improve the co-existence performance over conventional approaches.

Advancing protection for transmitting WLAN circuits (i.e., backing off from a WLAN transmission operation) can help reduce or prevent WLAN circuits from unnecessarily scheduling transmissions that would result in the abrupt switch (e.g., antenna switching) from WLAN circuits to coex circuits (e.g., Bluetooth) in the middle of the WLAN transmission. This can help conserve processing power and unnecessary transmission power.

Embodiments are directed to methods, devices and systems that include, by operation of WLAN circuits, determining an estimated start time and estimated duration of coex communications. In response to at least a medium being free, a first CTS-to-self frame can be transmitted that has a first duration equivalent to the estimated duration for the coex communications. In response to receiving an actual coex communication start signal indicating an actual start for the coex communications, WLAN circuits can determine if the duration of the first CTS-to-self frame is sufficient to cover an actual duration for the coex communications. If the first duration is not sufficient to cover the actual duration, a second CTS-to-self frame can be transmitted with a second duration that extends beyond the first duration sufficient to cover the actual duration.

Embodiments are directed to methods, devices and systems that include WLAN circuits having a controller section configured to determine an estimated duration for coex communications, the coex communications being compatible with a second communications protocol different than WLAN. The controller section can generate a first CTS-to-self data having a first duration equivalent to the estimated duration for the future coex communications and receive an actual coex communication start signal indicating an actual start for the coex communications. In response to determining that an actual duration of the coex communication extends beyond the first duration, WLAN circuits can generate second CTS-to-self data having a second duration that extends beyond the first duration sufficient to cover the actual duration. Media access control (MAC) circuits can be configured to create at least the first and second CTS-to-self frames from first and second CTS-to-self data. Physical layer (PHY) circuits can be configured to receive WLAN frames and transmit WLAN frames, including first and second CTS-to-self frames.

A system can include WLAN circuits configured to determine an estimated start time and estimated duration for coex communications, transmit a first CTS-to-self frame having a first duration equivalent to the estimated duration for the coex communications, and receive an actual coex communication start signal indicating an actual start for the coex communications. WLAN circuits can also, in response to determining that an actual duration of the coex communication extends beyond the first duration, transmit a second CTS-to-self frame having a second duration that extends beyond the first duration sufficient to cover the actual duration. A system can also include coex communication circuits configured to communicate on the same medium as WLAN communications but according to a second communications protocol different than WLAN, and generate the actual coex communication start signal.

Methods devices and systems according to embodiments can include, in response to receiving a predetermined request for WLAN activity, determining if the WLAN activity would extend beyond the estimated start time. If the WLAN activity would extend beyond the estimated start time, not executing the WLAN activity, and if the WLAN activity would not extend beyond the estimated start time, executing the WLAN activity.

Methods devices and systems according to embodiments can include, the predetermined request including a RTS frame from another WLAN device; and executing the access includes transmitting a clear-to-send (CTS) frame in response to the RTS frame.

Methods devices and systems according to embodiments can further include WLAN circuits receiving coex communication data from the coex wireless circuit; and determining the estimated start time for the coex communications from the coex communication data.

Methods devices and systems according to embodiments can further include, by operation of the WLAN circuits receiving coex communication data from the coex wireless circuit; and determining the estimated duration of the coex communications from the coex communication data.

Methods devices and systems according to embodiments can further include, determining the estimated duration for the coex communications from historical data from previous activity of the coex circuit.

Methods devices and systems according to embodiments can include the coex wireless circuit being selected from the group of: a Bluetooth compatible circuit, a Zigbee compatible circuit and a Thread compatible wireless circuit.

Methods devices and systems according to embodiments can include coex wireless circuits having transmit buffers configured to store data for transmission according to the second communications protocol. The coex circuits are configured to generate the coex communications data from at least a state of the transmission buffers.

Methods devices and systems according to embodiments can include coex wireless circuits and WLAN circuits formed with a same substrate.

Methods devices and systems according to embodiments can include a second communications protocol that includes Bluetooth, including Bluetooth Low Energy. The coex communications circuit include memory circuits configured to store a slot allocation mask (SAM), and configured to generate the coex communications data from the SAM.

Methods devices and systems according to embodiments can further include a serial bus coupled between the WLAN circuits and the coex communication circuits; the coex communication circuits are configured to generate coex communication data; and the WLAN circuits are configured to determine the estimated start time and estimated duration from the coex communication data.

Methods devices and systems according to embodiments can further include the coex communication circuits include a transmit buffer and are configured to generate duration data from at least a state of the transmit buffer; and the WLAN circuits are configured to determine the estimated duration from the duration data.

Methods devices and systems according to embodiments can include the WLAN circuits are configured to in response to receiving a predetermined request for the WLAN circuits to access the medium with a WLAN communication, determining if the WLAN communication would extend beyond the estimated start time, if the WLAN communication would extend beyond the estimated start time, not executing the WLAN communication, and if the access would not extend beyond the estimated start time, executing the WLAN communication.

It should be appreciated that reference throughout this specification to “one embodiment” or “an embodiment” means that a particular feature, structure or characteristic described in connection with the embodiment is included in at least one embodiment of the present invention. Therefore, it is emphasized and should be appreciated that two or more references to “an embodiment” or “one embodiment” or “an alternative embodiment” in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device, comprising:

IEEE 802.11 compatible (WLAN) circuits, including a controller section configured to determine an estimated duration for future communications of a coexisting wireless circuit (coex communications), the coex communications being compatible with a second communications protocol different than WLAN, generate a first clear-to-send-to-self (CTS-to-self) data having a first duration equivalent to the estimated duration for the future coex communications, in response to an actual coex communication start signal provided at an actual start for the coex communications, upon determining that an actual duration of the coex communication extends beyond the first duration, generate second CTS-to-self data having a second duration that extends beyond the first duration sufficient to cover the actual duration;

media access control (MAC) circuits configured to create at least the first and second CTS-to-self frames from first and second CTS-to-self data; and physical layer (PHY) circuits configured to receive WLAN frames and transmit WLAN frames, including transmitting the first and second CTS-to-self frames prior to the coex communications.

2. The device of claim 1, wherein:

the WLAN circuits are configured to in response to receiving a predetermined request for WLAN communications, determine if the WLAN communications would extend beyond an estimated start time of the coex communications, if the WLAN communication would extend beyond the estimated start time, not execute the WLAN communications, and if the access would not extend beyond the estimated start time, execute the WLAN communications.

3. The device of claim 1, wherein:

the controller section is configured to receive communications data from the coexisting wireless circuit, and determine the estimated duration and an estimated start time for the coex communications from the communications data.

4. The device of claim 3, wherein:

the coex wireless circuits include transmit buffers configured to store data for transmission according to a second communications protocol and are configured to generate the coex communications data from at least a state of the transmit buffers.

5. The device of claim 3, wherein:

the second communications protocol includes Bluetooth, including Bluetooth Low Energy; and the coex communications circuit include memory circuits configured to store a slot allocation mask (SAM), and configured to generate the coex communications data from at least the SAM.

6. The device of claim 1, further including the coex wireless circuits and WLAN circuits are formed with a same substrate.

7. The device of claim 6, wherein the second protocol is selected from the group consisting of: Bluetooth, including Bluetooth Low Energy; Zigbee and Thread.

8. A system, comprising:

IEEE 802.11 compatible (WLAN) circuits configured to determine an estimated duration for communications of a coexisting wireless circuit (coex communications), transmit a first clear-to-send-to-self (CTS-to-self) frame having a first duration equivalent to the estimated duration for the coex communications, in response to an actual coex communication start signal provided at an actual start for the coex communications, upon determining that an actual duration of the coex 30 communication extends beyond the first duration, prior to the coex communications, transmit a second CTS-to-self frame having a second duration that extends beyond the first duration sufficient to cover the actual duration; and the coex communication circuits configured to communicate on the same medium as WLAN communications but according to a second communications protocol different than WLAN, and generate the actual coex communication start signal.

9. The system of claim 8, wherein the second communications protocol is selected from the group of: Bluetooth, including Bluetooth Low Energy; Zigbee and Thread.

10. The system of claim 8, further including:

a serial bus coupled between the WLAN circuits and the coex communication circuits;

the coex communication circuits are configured to generate coex communication data; and the WLAN circuits are configured to determine at least the estimated start time from the coex communication data.

11. The system of claim 8, wherein:

the coex communication circuits include a transmit buffer and are configured to generate duration data from at least a state of the transmit buffer; and the WLAN circuits are configured to determine the estimated duration from the duration data.

12. The system of claim 8, wherein:

the WLAN circuits are configured to in response to receiving a predetermined request for WLAN communications, determine if the WLAN communication would extend beyond an estimated start time of the coex communications, if the WLAN communications would extend beyond the estimated start time, not execute the WLAN communications, and if the access would not extend beyond the estimated start time, execute the WLAN communications.

13. The system of claim 8, wherein the WLAN circuits and coex communication circuits are formed with a same integrated circuit substrate.

* * * * *